(12) United States Patent
Andrews et al.

(10) Patent No.: US 9,438,691 B1
(45) Date of Patent: Sep. 6, 2016

(54) ONLINE SOCIAL REFERRAL NETWORK

(71) Applicant: Supirb Technologies, LLC, Seattle, WA (US)

(72) Inventors: Maxwell George Andrews, Kirkland, WA (US); Lauren Michelle Broomall, Kirkland, WA (US); Alissa Marie Brodin Desancic, Seattle, WA (US); Peter Warren Moon, Kirkland, WA (US); David Frederick Kramer, Allen, TX (US)

(73) Assignee: Supirb Technologies, LLC, Seattle, WA (US)

( * ) Notice: Subject to any disclaimer, the term of this patent is extended or adjusted under 35 U.S.C. 154(b) by 0 days.

(21) Appl. No.: 14/923,250

(22) Filed: Oct. 26, 2015

(51) Int. Cl.
*G06F 15/16* (2006.01)
*H04L 29/08* (2006.01)
*H04L 12/58* (2006.01)

(52) U.S. Cl.
CPC ............ *H04L 67/306* (2013.01); *H04L 51/32* (2013.01)

(58) Field of Classification Search
CPC ............ G06Q 50/01; G06Q 30/0214; G06Q 30/0276; G06Q 20/351; H04L 67/306; H04N 21/4756; H04N 21/8126
See application file for complete search history.

(56) References Cited

U.S. PATENT DOCUMENTS

| | | | | |
|---|---|---|---|---|
| 8,949,250 B1* | 2/2015 | Garg | ............... | G06F 17/3053 707/748 |
| 2012/0158455 A1* | 6/2012 | Pathak | ............... | G06Q 30/0201 705/7.29 |
| 2015/0178283 A1* | 6/2015 | Garg | ............... | G06F 17/3053 707/748 |
| 2015/0178397 A1 | 6/2015 | Garg et al. | | |
| 2016/0055534 A1* | 2/2016 | Jing | ............... | G06Q 30/0259 705/14.55 |

* cited by examiner

*Primary Examiner* — Hitesh Patel
(74) *Attorney, Agent, or Firm* — John W. Branch; Lowe Graham Jones PLLC

(57) ABSTRACT

Embodiments are directed to users viewing and referring cards of content to other users. A user may refer a card by endorsing the card. By friending other users, users form a social network. Thus, a user may refer a card to friends, friends of friends, and other users. Cards may include one or more card tallies that are specific to a particular user. Card tallies may refer to the number of friends, of the particular user, that have endorsed the card, the number of friends of friends that have endorsed the card, and other users that have endorsed the card. By viewing the card tallies, the particular user may determine a utility of the card based on the number of the user's friends that have endorsed the card, the number of friends of friends that have endorsed the card, and the number of other users that have endorsed the card.

21 Claims, 16 Drawing Sheets

ONLINE SOCIAL REFERRAL NETWORK

TECHNICAL FIELD

The present disclosure relates generally to online social networks, and more particular, but not exclusive, to providing selective referrals of content included in cards to users of a social network.

BACKGROUND

Online platforms enable users to form social networks, as well as to view and contribute content to the social network. As the number of users, as well as the connectedness of these social networks, grows, the volume of viewable content available to any particular user may grow exponentially. A user of large and highly connected social networks may experience difficulty in efficiently locating high quality content directed to subjects that are of a particular interest to the user. It is for these and other concerns that the following disclosure is provided.

DETAILED DESCRIPTION OF THE INVENTION

Figure 1:
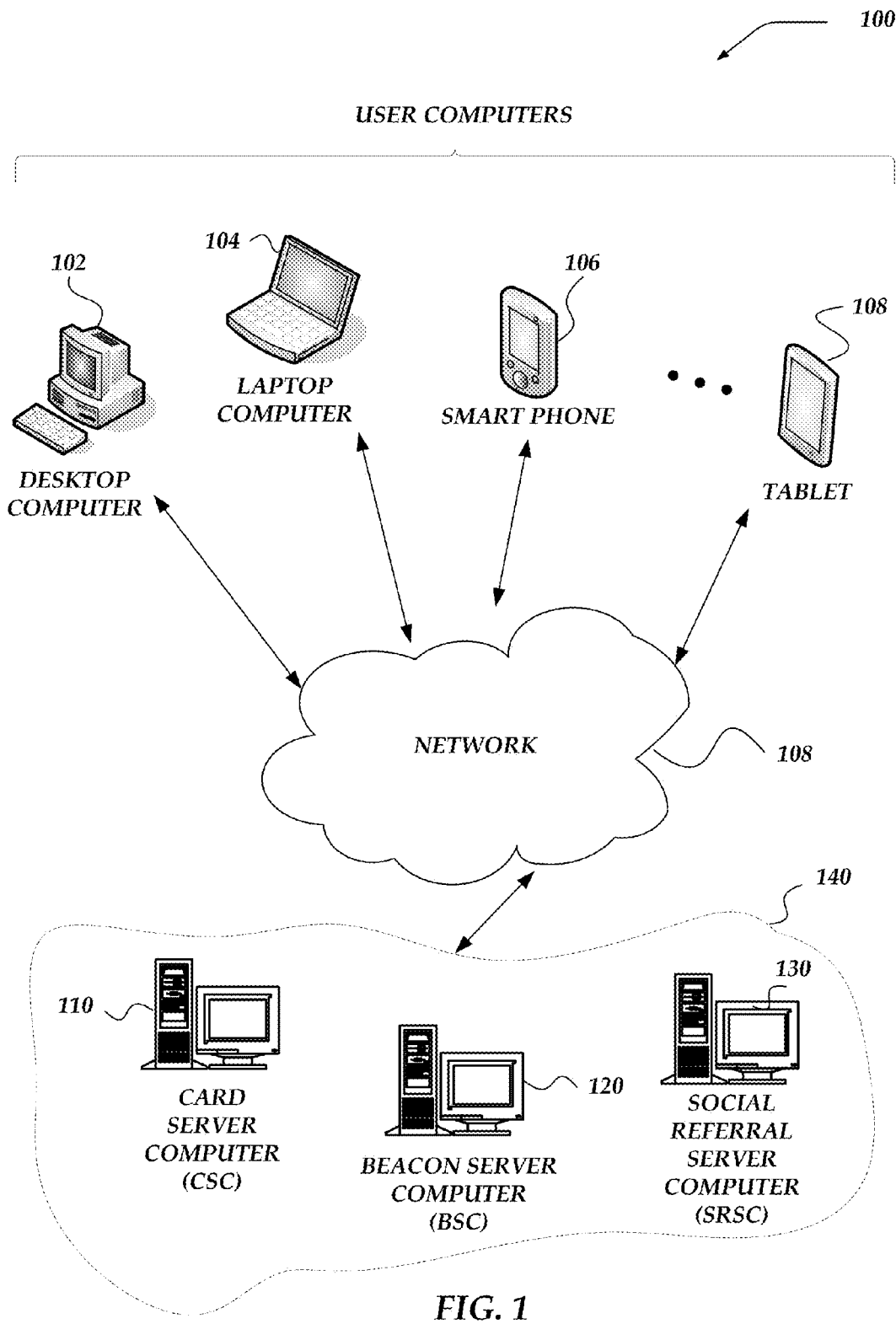
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As user herein, the term "card" may refer to data, content, or any other such information. In some embodiments, a card may include an electronic business card or some other collection of related data or content. As such, a card may be associated with or directed towards a particular subject, such as a person, place, or thing. The subject of a card may be a tangible subject, such as, but not limited to an individual, a business, an entity, an organization, an event, online content such as an article or blog, a location or place, a physical structure, a party, or the like. In some embodiments, the subject may be an intangible subject, such as an idea, a movement, or the like.

Content or data included in a single card may be associated with or directed towards the subject of the card. At least a portion of the content or data included in a card may be structured in a plurality of data fields. Such data fields may include type, name, title, description, and the like. For instance, data in the type data field make indicate the type of subject of the card. For instance, the type of a card may be a restaurant, doctor, article, product, thing, or the like. The name or title of a card may indicate a specific subject of the type of the card. For instance, the name data field may indicate the name of a specific individual service provider, a specific restaurant, a specific online magazine or blog, or the like. Other fields of various cards include, but are not limited to physical address, phone number(s), email address, website uniform resource locator (URL), social media identifiers, type of cuisine, type of product, type of service, retail price, where to buy, author, source, event dates, and the like associated with the subject.

A card may include multimedia content, such as but not limited to image, video, and/or audio data. For instance, a card may include an image of the subject, a trademark of the subject, or the like. In various embodiments, a card may include geo-location data and/or an electronic map in reference to a location of the subject of the card. Similar to physical business cards, a card may be structured such that a portion of the included content or data is included in a front side of the card and another portion of the included content or data is included in a backside of the card. A user may be provided the data included in the front side of the card by viewing the front side of the card. Likewise, a user may be provided the data included in the backside of the card by turning over and viewing the backside of the card.

In at least some embodiments, a card may include one or more tags. The tags may be metadata tags. As used herein, the term "card features" may refer to any of the content or data, including the data field, tags, multimedia, and the like, included in a card Briefly stated, embodiments are directed to providing referrals of online content to a plurality of users of a platform. The content may be included in one or more cards that are each directed to one or more subjects. A user may refer a card to other users of the platform by endorsing the card. By friending other users of the platform, the users form a social network of the platform. Thus, the user may refer a card to friends, as well as other users by endorsing the card and providing appropriate privacy parameters associated with the card. A degree of connectivity (N-degree) between any pair of users of the platform is based on a graph corresponding to the social network.

In addition to a plurality of cards, users, and a social network, the platform may include a plurality of card networks. Cards with equivalent, or at least similar subjects, may be organized in a coupled card network associated with the subject. The structure of a particular card network may be based on associations between the cards and one or more users of the platform. The card networks enable at least a partial synchronization of the various card features of cards included in the card network, as well as the determination of card tallies as discussed below. The plurality of cards and card networks included in the platform may be referred to as the card-sphere of the platform.

By generating specific associations with a card, a user of the platform may endorse the card, or endorse other cards that are directed to an equivalent, or at least a similar, subject. By endorsing a card, the user may provide a recommendation or referral of the card or the subject of the card to at least a portion of the other users of the platform. The user may determine which other users are provided access to view which cards the user has endorsed via user settable privacy parameters.

The platform may enable a user to organize the cards the user has endorsed, as well as other cards of interests in a user owned card catalog. The user may provide further organization of the cards of interest via card collections included in the user's card catalog. Furthermore, users may employ a card clipboard to store cards. The structure of the card networks may be based on the associations between cards and users, as well as the user provided privacy parameters and user owned card catalogs and card collections.

Cards may include one or more card tallies that are specific to each user of the platform. A card tally of a card that is specific to a particular user may be an N-tuple of scores for the card with respect to the particular user. Each score in the N-tuple may correspond to a metric based on the number of N-degree users (with respect to the particular user) that have endorsed the card. Accordingly, card tallies may be based on a structure of the card network, as well as a structure of the social network of the platform.

In one exemplary, but non-limiting embodiment, a card may include a separate card tally specific to each user that includes a 3-tuple. The first score in the 3-tuple specific to a particular user may indicate the number of friends (1-degree users) of the particular user that have endorsed the card. The second score in the 3-tuple may indicate the number of friends of friends (2-degree users) of the particular user that have endorsed the card. The third score in the 3-tuple may indicate the number of other users that have endorsed the card, where other users are users of the platform that are not 1-degree users (with respect to the particular user) and are not 2-degree users (with respect to the particular user).

The platform may enable a user to views cards, including the one or more card tallies that are specific to the user. The provided card tallies enable the user to determine a utility of the card based on the number of the user's friends that have endorsed the card, the number of friends of friends that have endorsed the card, and the number of other users that have endorsed the card.

In at least some embodiments, the platform may enable users to generate beacons, view beacons generated by other users, and respond to the beacons generated by other users by providing at least cards, which are relevant to a subject of the beacon, to the user that generated the beacon. In various embodiments, a beacon and a beacon response may include data, including but not limited to message data. In various embodiments, a beacon may include a request for information regarding one or more topics, a request for a referral or recommendation regarding one or more topics, a request for cards directed towards one or more topics, or any other such request. As such, a beacon may be provided to other users. Other users may respond to a user's beacons by sharing or providing relevant cards, messages, information, and the like.

The platform may also enable users to join and participate in one or more user communities. In various embodiments, a user community may be a community of users or members that join the community to exchange information, content, cards, or the like. The community may be directed to a common topic, subject, organization, or the like. Members of a community may or may not be friends, or otherwise be connected via the social network of the platform.

Illustrated Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include card server computer (CSC) 110, beacon server computer (BSC) 120, social referral server computer (SRSC) 130, user computers 102-108, and network 108.

In various embodiments, system 100 includes an online social referral (OSR) platform 140. OSR platform 140 may include one or more server computers, such as but not limited to CSC 110, BSC 120, and SRSC 130. OSR platform 140 may include one or more instances of mobile or network computers, including but not limited to any of mobile computer 200 of FIG. 2 and/or network computer 300 of FIG. 3. In at least one embodiment, OSR platform 140 includes at least one or more of the user computers 102-108. Although not shown, OSR platform 140 may include one or more data storage devices, such as rack or chassis-based data storage systems. Any of the databases discussed herein may be at least partially stored in data storage devices within OSR platform 140. As shown, any of the network devices, including the data storage devices included in OSR platform 140 may be accessible by other network devices, via network 108. OSR platform 140 may include one or more systems or sub-systems.

Various embodiments of user computers 102-108 are described in more detail below in conjunction with mobile computer 200 of FIG. 2. Furthermore, at least one embodiment of user computers 102-108 is described in more detail in conjunction with network computer 300 of FIG. 3. Briefly, in some embodiments, at least one of the user computers 102-108 may be configured to communicate with at least one mobile and/or network computer included in OSR platform 140, including but not limited to CSC 110, BSC 120, SRSC 130, and the like. In various embodiments, one or more user computers 102-108 may be enabled to access, interact with, and/or view user interfaces, content, cards, and the like provided by OSR platform 140, such as through a web browser. For instance, a user of computer such as but not limited to user computers 102-108 may be provided any of the user interfaces discussed herein, including but not limited to the user interfaces discussed in conjunction with FIGS. 4A-4D and FIG. 11. In at least one of various embodiments, a user of any of user computers 102-108 may be enabled to review content, including cards provided by OSR platform 140. The user may be enabled to provide card, beacon, community, messaging, and/or friend request data to OSR platform 140, as well as receive one or more cards from OSR platform 140.

In at least one of various embodiments, user computers 102-108 may be enabled to receive content, including cards. User computers 102-108 may be enabled to communicate (e.g., via a Bluetooth or other wireless technology, or via a USB cable or other wired technology) with OSR platform 140. In some embodiments, at least some of user computers 102-108 may operate over a wired and/or wireless network to communicate with other computing devices, including any other of user computers 102-108 and/or any computer included in OSR platform 140.

Generally, user computers 102-108 may include computing devices capable of communicating over a network to send and/or receive information, perform various online and/or offline activities, or the like. It should be recognized that embodiments described herein are not constrained by the number or type of user computers employed, and more or fewer user computers—and/or types of user computers—than what is illustrated in FIG. 1 may be employed. At least one user computer 102-108 may be a client computer or a server computer.

Devices that may operate as user computers 102-108 may include various computing devices that typically connect to a network or other computing device using a wired and/or wireless communications medium. User computers 102-108 may include mobile devices, portable computers, and/or non-portable. Examples of non-portable computers may include, but are not limited to, desktop computers 102, personal computers, multiprocessor systems, microprocessor-based or programmable electronic devices, network PCs, or the like, or integrated devices combining functionality of one or more of the preceding devices. Examples of portable computers may include, but are not limited to, laptop computer 104. Examples of mobile computers include, but are not limited to, smart phone 106, tablet computers 108, cellular telephones, display pagers, Personal Digital Assistants (PDAs), handheld computers, wearable computing devices, or the like, or integrated devices combining functionality of one or more of the preceding devices. As such, user computers 102-108 may include computers with a wide range of capabilities and features.

User computers 102-108 may access and/or employ various computing applications to enable users to perform various online and/or offline activities. Such activities may include, but are not limited to, generating documents, gathering/monitoring data, capturing/manipulating images, reviewing content, including but not limited to card, card network, beacon, beacon response, user profile data, platform data, social referral data, and the like, managing media, managing financial information, playing games, managing personal information, browsing the Internet, or the like. In some embodiments, user computers 102-108 may be enabled to connect to a network through a browser, or other web-based application.

User computers 102-108 may further be configured to provide information that identifies the user computer. Such identifying information may include, but is not limited to, a type, capability, configuration, name, or the like, of the user computer. In at least one embodiment, a user computer may uniquely identify itself through any of a variety of mechanisms, such as an Internet Protocol (IP) address, phone number, Mobile Identification Number (MIN), media access control (MAC) address, electronic serial number (ESN), or other device identifier.

Various embodiments of CSC 110 are described in more detail below in conjunction with network computer 300 of FIG. 3. At least one embodiment of CSC 110 is described in conjunction with mobile computer 200 of FIG. 2. Briefly, in some embodiments, CSC 110 may be operative transmit and receive cards, manage card networks, and generally carry out any task or process described herein, including, but not limited to any task regarding cards and/or card networks. CSC 110 may be operative to communicate with user computers 102-108 to provide users of user computers 102-108 various cards, card tallies, and the like, as well as receive cards from any of user computers 102-108.

Various embodiments of BSC 120 are described in more detail below in conjunction with network computer 300 of FIG. 3. At least one embodiment of BSC 120 is described in conjunction with mobile computer 200 of FIG. 2. Briefly, in some embodiments, BSC 120 may be operative to receive and/or transmit beacons and/or beacon responses to and from any of user computers 102-108 and generally carry out any task or process described herein, including, but not limited to any task regarding beacons. BSC 120 may be operative to communicate with user computers 102-108 to provide users of user computers 102-108 108 various beacons, beacon responses, and the like, as well as receive beacons and beacon responses from any of user computers 102-108.

Various embodiments of SRSC 130 are described in more detail below in conjunction with network computer 300 of FIG. 3. At least one embodiment of SRSC 130 is described in conjunction with mobile computer 200 of FIG. 2. Briefly, in some embodiments, SRSC 130 may be operative to provide and receive online social referral data, including messages, cards, beacons, beacon response, and the like. SRSC 130 may be operative to communicate with user computers 102-108 to provide users of user computers 102-108 with content and one or more associated assessment tools. In at least one embodiment, the SRSC 130 provides messages, cards, and other data to users of user computers 102-108.

Network 108 may include virtually any wired and/or wireless technology for communicating with a remote device, such as, but not limited to, USB cable, Bluetooth™, Wi-Fi™, or the like. In some embodiments, network 108 may be a network configured to couple network computers with other computing devices, including user computers 102-108 and the like. In at least one of various embodiments, sensors may be coupled to network computers via network 108, which is not illustrated in FIG. 1. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least user computers 102-108 and the like. Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between user computers 102-108, computers included in OSR platform 140, other computing devices not illustrated, other networks, and the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

Illustrative Mobile Computer

Figure 2:
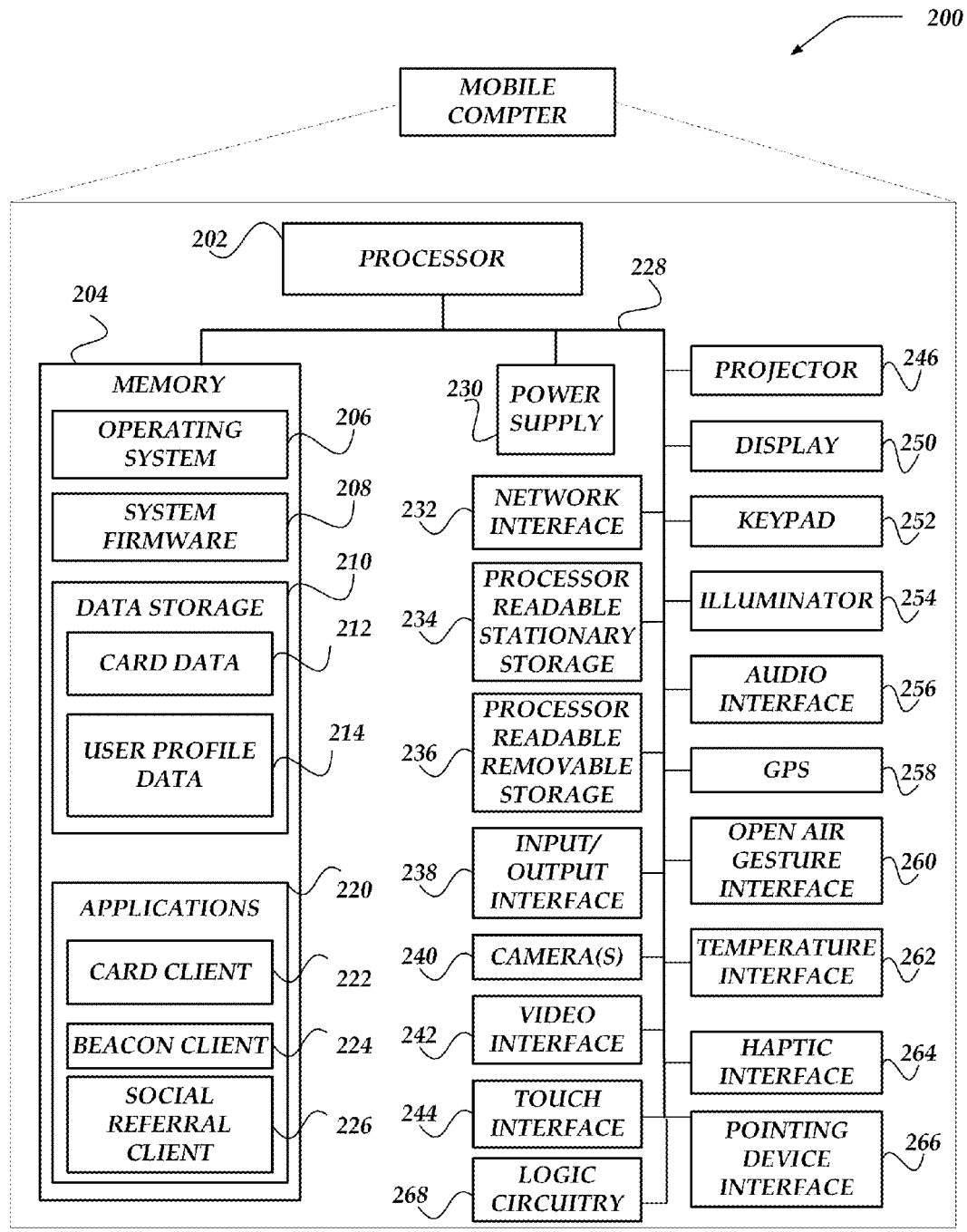
FIG. 2 shows an embodiment of a mobile computer that may be included in a system such as that shown in FIG. 1.

FIG. 2 shows one embodiment of mobile computer 200 that may include many more or less components than those shown. Mobile computer 200 may represent, for example, at least one embodiment of user computers 102-108, or a computer included in OSR platform 140. So, mobile computer 200 may be a mobile device (e.g., a smart phone or tablet), a stationary/desktop computer, or the like.

Mobile computer 200 may include processor 202, such as a central processing unit (CPU), in communication with memory 204 via bus 228. Mobile computer 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Mobile computer 200 may optionally communicate with a base station (not shown), or directly with another computer. And in one embodiment, although not shown, an accelerometer or gyroscope may be employed within mobile computer 200 to measuring and/or maintaining an orientation of mobile computer 200.

Additionally, in one or more embodiments, the mobile computer 200 may include logic circuitry 268. Logic circuitry 268 may be an embedded logic hardware device in contrast to or in complement to processor 202. The embedded logic hardware device would directly execute its embedded logic to perform actions, e.g., an Application Specific Integrated Circuit (ASIC), Field Programmable Gate Array (FPGA), and the like.

Also, in one or more embodiments (not shown in the figures), the mobile computer may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

Power supply 230 may provide power to mobile computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling mobile computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of mobile computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Mobile computer 200 may also comprise input/output interface 238 for communicating with external peripheral devices or other computers such as other mobile computers and network computers. Input/output interface 238 may enable mobile computer 200 to communicate with one or more servers, such as CSC 110 of FIG. 1. In some embodiments, input/output interface 238 may enable mobile computer 200 to connect and communicate with one or more network computers, user computers 102-108 of FIG. 1. Other peripheral devices that mobile computer 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a mobile computer 200. For example, the haptic interface 264 may be employed to vibrate mobile computer 200 in a particular way when another user of a computer is calling. Temperature interface 262 may be used to provide a temperature measurement input and/or a temperature changing output to a user of mobile computer 200. Open air gesture interface 260 may sense physical gestures of a user of mobile computer 200, for example, by using single or stereo video cameras, radar, a gyroscopic sensor inside a computer held or worn by the user, or the like. Camera 240 may be used to track physical eye movements of a user of mobile computer 200.

GPS transceiver 258 can determine the physical coordinates of mobile computer 200 on the surface of the Earth, which typically outputs a location as latitude and longitude values. Physical coordinates of a mobile computer that includes a GPS transceiver may be referred to as geo-location data. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile computer 200 on the surface of the Earth. It is understood that under different conditions, GPS transceiver 258 can determine a physical location for mobile computer 200. In at least one embodiment, however, mobile computer 200 may, through other components, provide other information that may be employed to determine a physical location of the mobile computer, including for example, a Media Access Control (MAC) address, IP address, and the like.

In at least one embodiment, GPS transceiver 258 is employed for localization of the various embodiments discussed herein. For instance, the various embodiments may be localized, via GPS transceiver 258, to customize the linguistics, technical parameters, time zones, configuration parameters, units of measurement, monetary units, and the like based on the location of a user of mobile computer 200. In a least one embodiment, a localization of at least a portion of any application included in mobile computer 200, such as but not limited to card client 222, beacon client 224, and social referral client 226, is performed based on at least the geo-location data or other data acquired by GPS transceiver 258 or other sensors included in mobile computer 200. For instance, time zone parameters, currency type, units, language parameters, and the like are set or otherwise configured in various portions of software included in one or more mobile computers. Furthermore, any process discussed herein, including but not limited to any process discussed in the context of any flowchart described herein, may be localized as such.

Human interface components can be peripheral devices that are physically separate from mobile computer 200, allowing for remote input and/or output to mobile computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A mobile computer 200 may include a browser application that is configured to receive and to send web pages, web-based messages, graphics, text, multimedia, and the like. Mobile computer's 200 browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

In various embodiments, the browser application may be configured to enable a user to log into an account and/or user interface to access/view content data. In at least one of various embodiments, the browser may enable a user to view reports of assessment data that is generated by OSR platform 140 of FIG. 1. In some embodiments, the browser/user interface may enable the user to customize a view of the report. As described herein, the extent to which a user can customize the reports may depend on permissions/restrictions for that particular user. A user of mobile computer 200 may be provided features of the various platforms discussed herein, including any of the user interfaces discussed herein, such as but not limited to the user interfaces discussed in conjunction with FIGS. 4A-4D and FIG. 11, via the browser application of mobile computer 200.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of mobile computer 200. The memory may also store operating system 206 for controlling the operation of mobile computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by mobile computer 200 to store, among other things, applications 220 and/or other data. For example, data storage 210 may store card data 212 and/or user profile 214. Data storage 210 may further include program code, data, algorithms, and the like, for use by a processor, such as processor 202 to execute and perform actions. In one embodiment, at least some of data storage 210 might also be stored on another component of mobile computer 200, including, but not limited to, non-transitory processor-readable removable storage device 236, processor-readable stationary storage device 234, or even external to the mobile device. Removable storage device 236 may be a USB drive, USB thumb drive, dongle, or the like.

Applications 220 may include computer executable instructions which, when executed by mobile computer 200, transmit, receive, and/or otherwise process instructions and data. Applications 220 may include card client 222. Card client 222 may transmit and/or receive any card data to and from OSR platform 140 or any user computer. Applications 220 may include beacon client 224. Beacon client 224 may transmit and/or receive beacon and/or beacon response data to and from OSR platform 140 or any user computer. Applications 220 may also include social referral client 226. Social client 226 may transmit and/or receive any online social referral data, including but not limited to message data, card data, beacon data, community data, and the like to and from OSR platform 140 or any user computer. In at least some embodiments, mobile computer 200 may not include at least one of card client 222, beacon client 224, or social referral client 226. Rather, a user of mobile computer may be provided certain functionalities of the platform via a browser application, such as a web browser.

Other examples of application programs that may be included in applications 220 include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

So, in some embodiments, mobile computer 200 may be enabled to employ various embodiments, combinations of embodiments, processes, or parts of processes, as described herein. Moreover, in various embodiments, mobile computer 200 may be enabled to employ various embodiments described above in conjunction with computer device of FIG. 1.

Illustrative Network Computer

Figure 3:
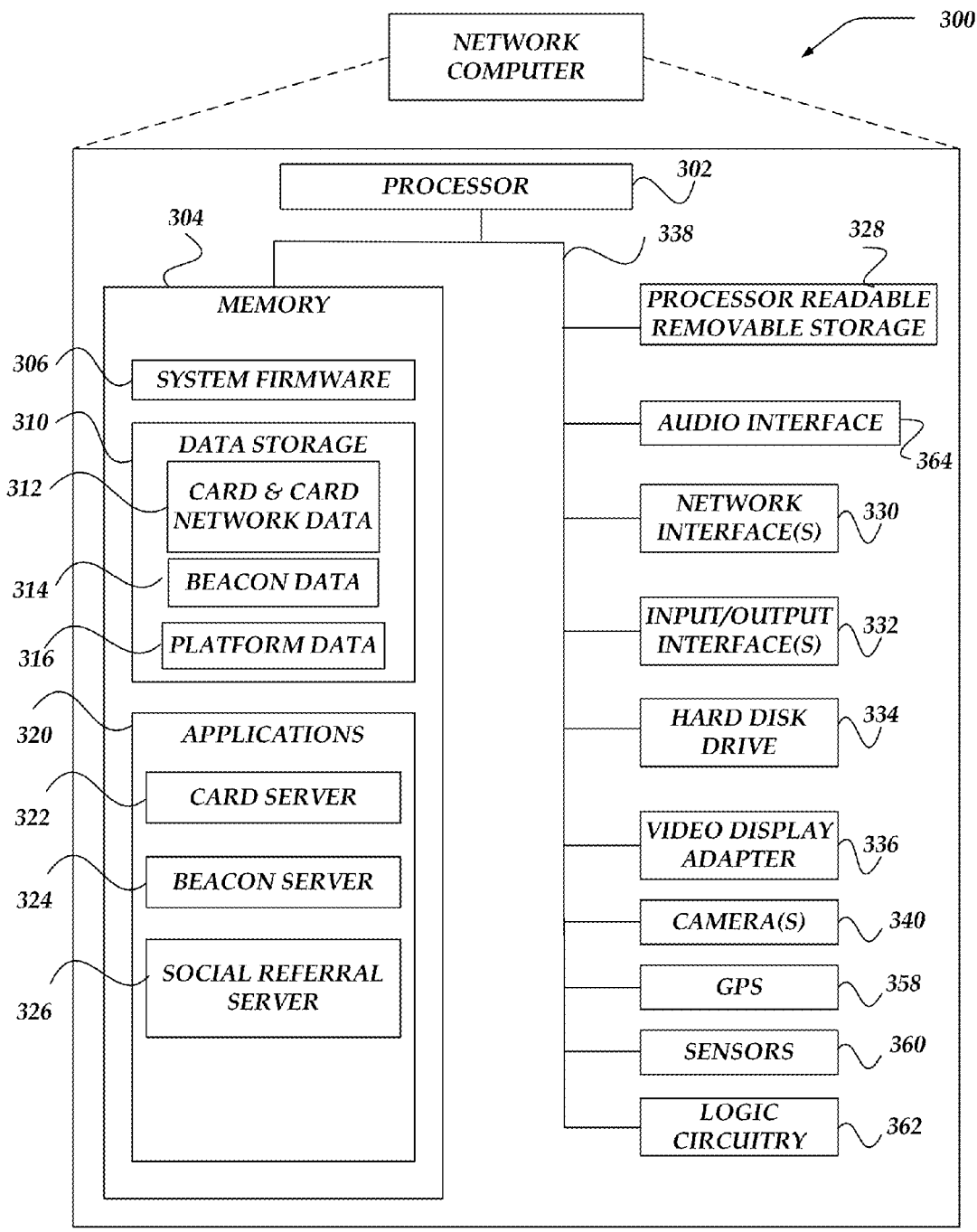
FIG. 3 illustrates an embodiment of a network computer that may be included in a system such as that shown in FIG. 1.

FIG. 3 shows one embodiment of network computer 300, according to one embodiment of the invention. Network computer 300 may represent, for example, at least one embodiment of user computers 102-108 or a computer included in OSR platform 140. Network computer 300 may be a desktop computer, a laptop computer, a server computer, a client computer, and the like.

Network computer 300 may include processor 302, such as a CPU, processor readable storage media 328, network interface unit 330, an input/output interface 332, hard disk drive 334, video display adapter 336, GPS 338, and memory 304, all in communication with each other via bus 338. In some embodiments, processor 302 may include one or more central processing units.

Additionally, in one or more embodiments (not shown in the figures), the network computer may include an embedded logic hardware device instead of a CPU. The embedded logic hardware device would directly execute its embedded logic to perform actions, e.g., an Application Specific Integrated Circuit (ASIC), Field Programmable Gate Array (FPGA), and the like.

Also, in one or more embodiments (not shown in the figures), the network computer may include a hardware microcontroller instead of a CPU. In at least one embodiment, the microcontroller would directly execute its own embedded logic to perform actions and access its own internal memory and its own external Input and Output Interfaces (e.g., hardware pins and/or wireless transceivers) to perform actions, such as System On a Chip (SOC), and the like.

As illustrated in FIG. 3, network computer 300 also can communicate with the Internet, cellular networks, or some other communications network (either wired or wireless), via network interface unit 330, which is constructed for use with various communication protocols. Network interface unit 330 is sometimes known as a transceiver, transceiving device, or network interface card (NIC). In some embodiments, network computer 300 may communicate with a user computer, or a computer included in an OSR platform 140, or any other network computer, via the network interface unit 320.

Network computer 300 also comprises input/output interface 332 for communicating with external devices, such as a various sensors or other input or output devices not shown in FIG. 3. Input/output interface 332 can utilize one or more communication technologies, such as USB, infrared, Bluetooth™, or the like.

Memory 304 generally includes RAM, ROM and one or more permanent mass storage devices, such as hard disk drive 334, tape drive, optical drive, and/or floppy disk drive. Memory 304 may store system firmware 306 for controlling the low-level operation of network computer 300 (e.g., BIOS). In some embodiments, memory 304 may also store an operating system for controlling the operation of network computer 300.

Although illustrated separately, memory 304 may include processor readable storage media 328. Processor readable storage media 328 may be referred to and/or include computer readable media, computer readable storage media, and/or processor readable storage device. Processor readable removable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by network computer 300 to store, among other things, card and card network data 312, beacon data 314, platform data 316, and/or other data. For example, data storage 310 may further include program code, data, algorithms, and the like, for use by a processor, such as processor 302 to execute and perform actions. In one embodiment, at least some of data storage 310 might also be stored on another component of network computer 300, including, but not limited to processor-readable storage media 328, hard disk drive 334, or the like.

Card and card network data 312 may include any data relating to cards and card networks as discussed herein. Likewise, beacon data 314 may include and data relating to beacons and beacon responses as discussed herein. Platform data 316 may include any data relating to OSR platform 140, including user profiles, user networks, communities, and the like as discussed herein.

Applications 320 may include computer executable instructions that can execute on processor 302 to perform actions. In some embodiments, one or more of applications 320 may be part of an application that may be loaded into mass memory and run on an operating system Applications 320 may include card server 322, beacon server 324, and assessment server 326. Card server 322 may manage and transmit/receive any card and card network data to and from any computer included in OSR platform 140. Likewise, card server 322 may transmit and/or receive any card and card network data to and from any of user computers, including any of user computers 102-108 of FIG. 1. Beacon server 324 may manage and transmit/receive any beacon and beacon response data to and from any computer included in OSR platform 140. Likewise, beacon server 324 may transmit and/or receive any beacon and beacon response data to and from any of user computers 102-108. Social referral server 326 may manage and transmit/receive any data relating to OSR platform 140 to and from any computer included in OSR platform 140. Likewise, social referral server 326 may transmit and/or receive any online social referral data to and from any of user computers 102-108.

GPS transceiver 358 can determine the physical coordinates of network computer 300 on the surface of the Earth, which typically outputs a location as latitude and longitude values. Physical coordinates of a network computer that includes a GPS transceiver may be referred to as geo-location data. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 358 can determine a physical location for network computer 300. In at least one embodiment, however, network computer 300 may, through other components, provide other information that may be employed to determine a physical location of the mobile computer, including for example, a Media Access Control (MAC) address, IP address, and the like.

In at least one embodiment, GPS transceiver 358 is employed for localization of the various embodiments discussed herein. For instance, the various embodiments may be localized, via GPS transceiver 358, to customize the linguistics, technical parameters, time zones, configuration parameters, units of measurement, monetary units, and the like based on the location of a user of network computer 300. In a least one embodiment, a localization of at least a portion of any application included in network computer 300, such as but not limited to card server 322, beacon server 324, and social referral server 326, is performed based on at least the geo-location data or other data acquired by GPS transceiver 358 or other sensors included in network computer 300. For instance, time zone parameters, currency type, units, language parameters, and the like are set or otherwise configured in various portions of software included in one or more network computers. Furthermore, any process discussed herein, including but not limited to any process discussed in the context of any flowchart described herein, may be localized as such.

Audio interface 364 may be arranged to produce and receive audio signals such as the sound of a human voice. For example, audio interface 354 may be coupled to a speaker and microphone (not shown) to enable telecommunication with others and/or generate an audio acknowledgement for some action. A microphone in audio interface 364 can also be used for input to or control of network computer 300, e.g., using voice recognition, detecting touch based on sound, and the like. Likewise, a camera 340 may be included with network computer 300 to capture image and/or video data. Other sensors 360 may be included to sense a location, or other environment component.

Additionally, in one or more embodiments, the network computer 300 may include logic circuitry 362. Logic circuitry 362 may be an embedded logic hardware device in contrast to or in complement to processor 302. The embedded logic hardware device would directly execute its embedded logic to perform actions, e.g., an Application Specific Integrated Circuit (ASIC), Field Programmable Gate Array (FPGA), and the like.

So, in some embodiments, network computer 300 may be enabled to employ various embodiments, combinations of embodiments, processes, or parts of processes, as described herein. Moreover, in various embodiments, network computer 300 may be enabled to employ various embodiments described above in conjunction with computer device of FIG. 1.

Platform Overview

Figure 4A:
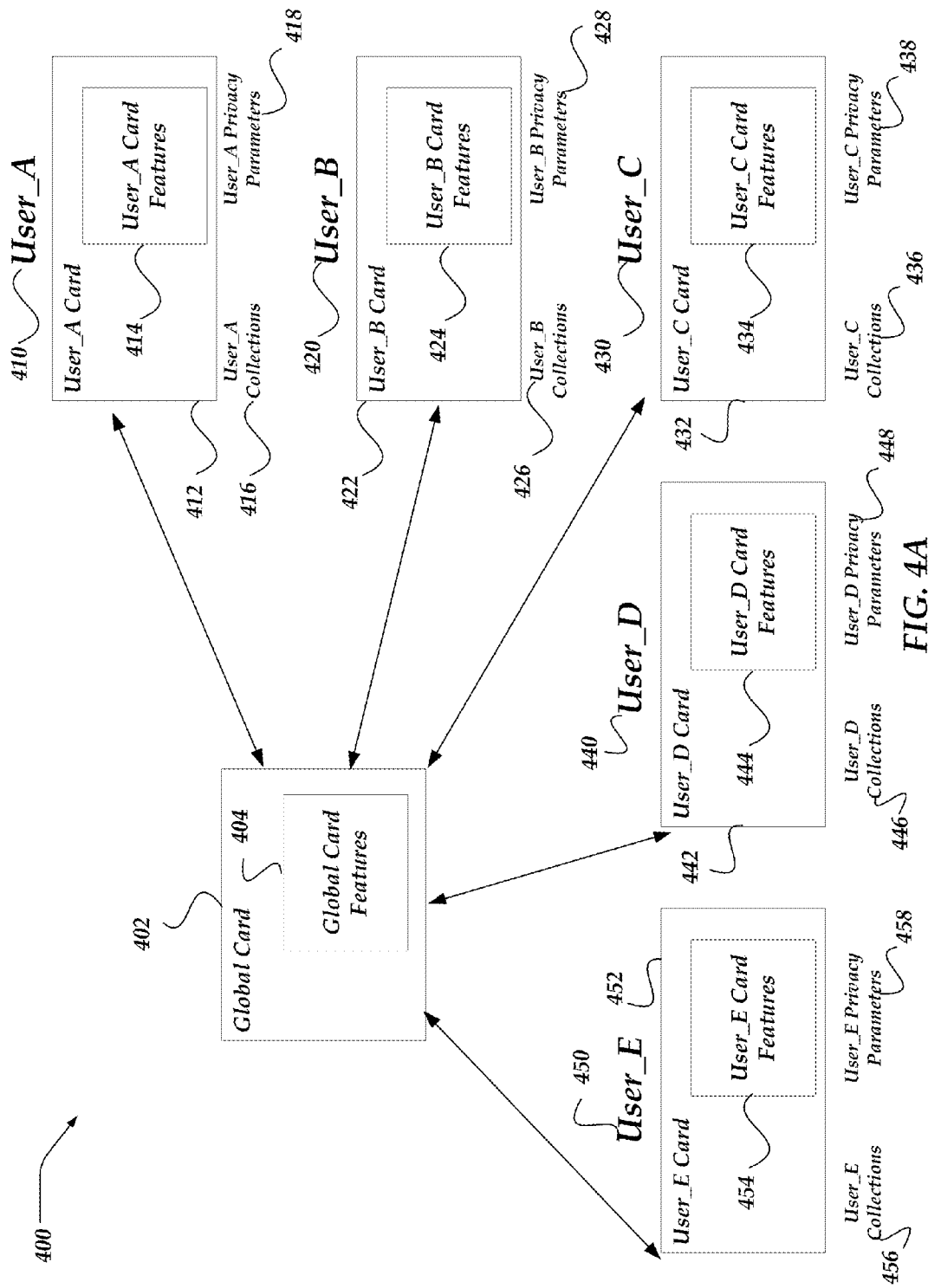
FIG. 4A shows one exemplary embodiment of a card network that is consistent with at least one of the various embodiments.
Figure 4B:
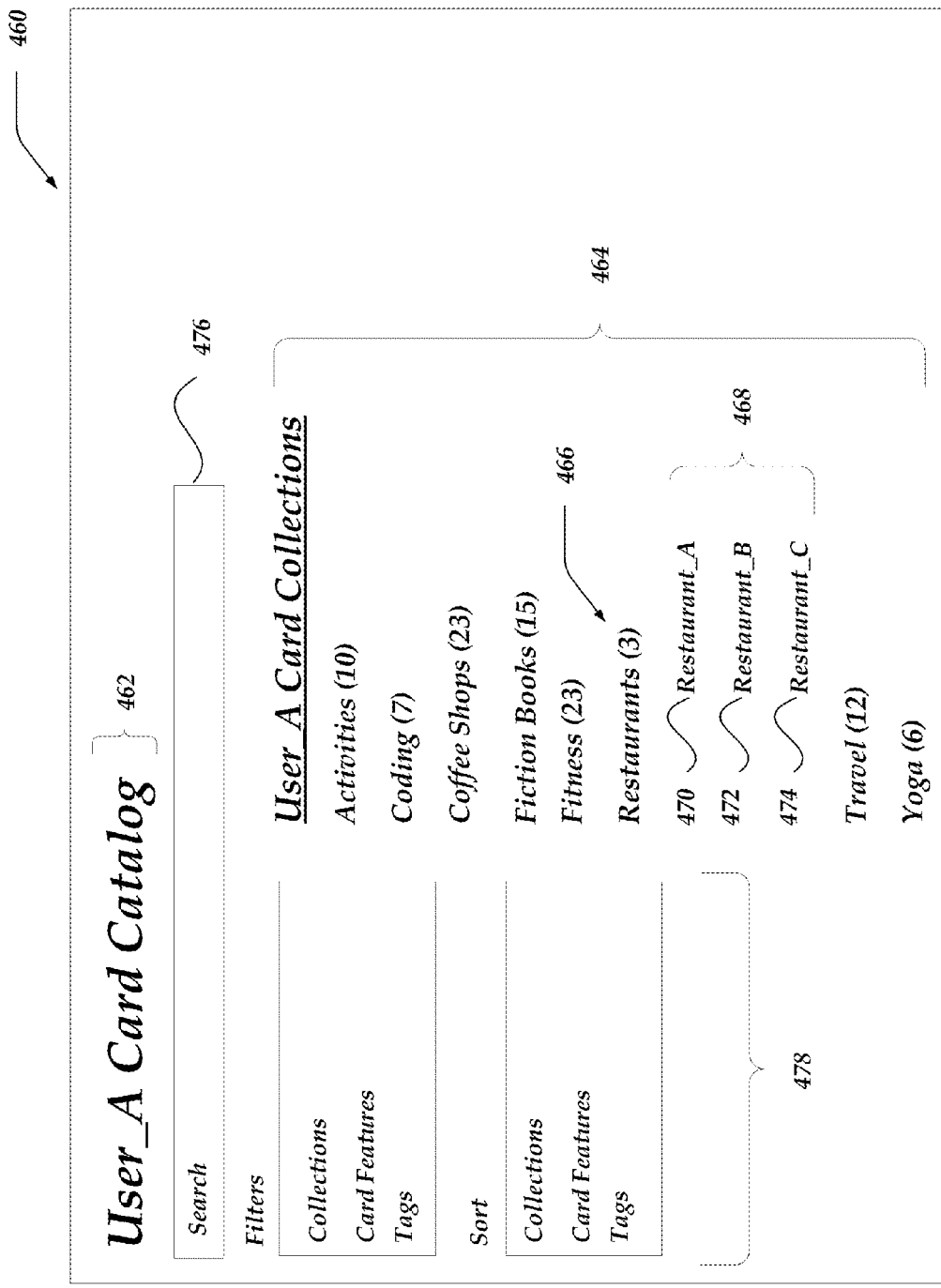
FIG. 4B shows one exemplary embodiment of a user interface that provides a user access to a user card catalog, in accordance with at least a portion of the various embodiments.
Figure 4C:
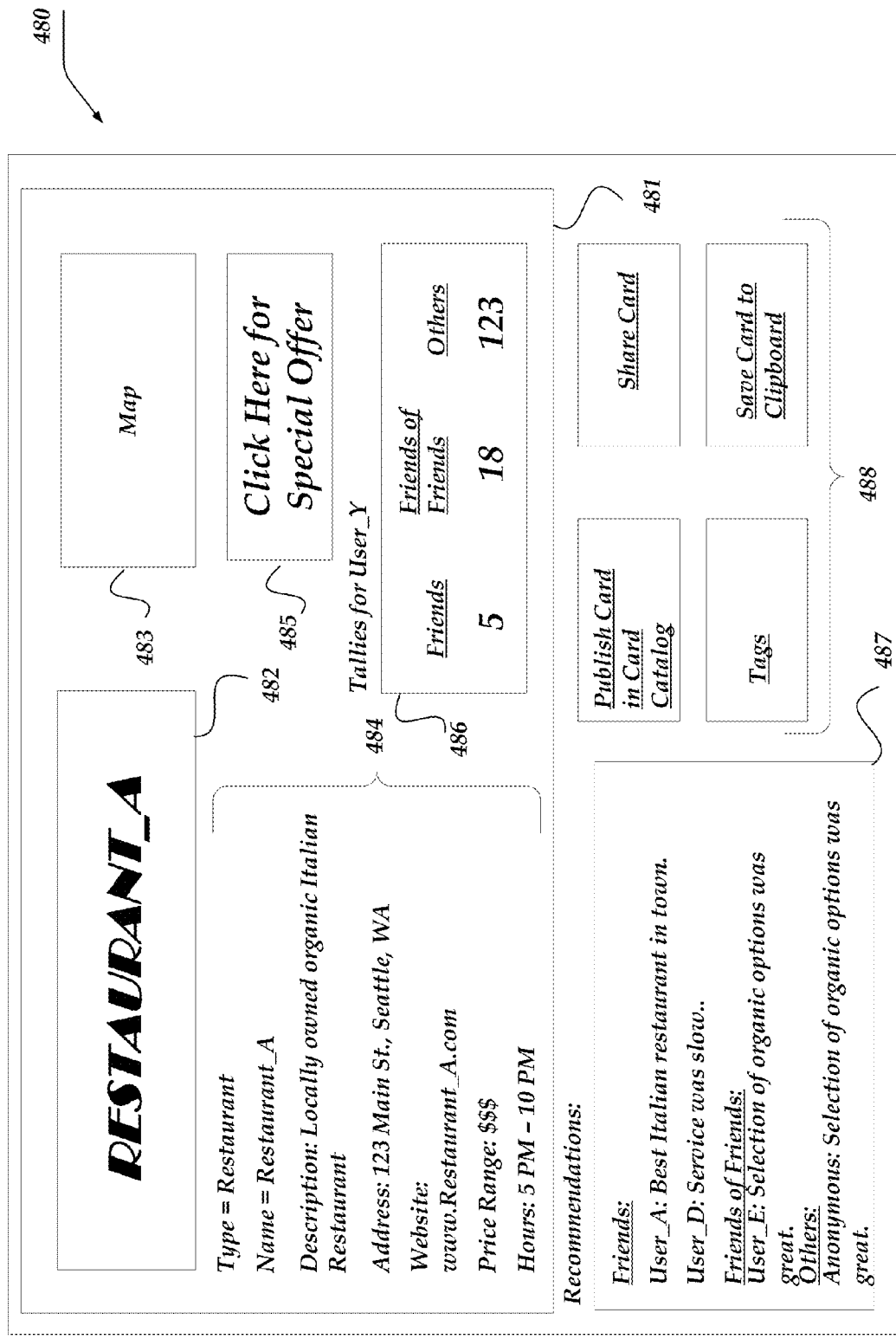
FIG. 4C shows one exemplary embodiment of a user interface that provides a user a card and enables the user to publish, save, share, or tag the card, in accordance with at least a portion of the various embodiments.
Figure 4D:
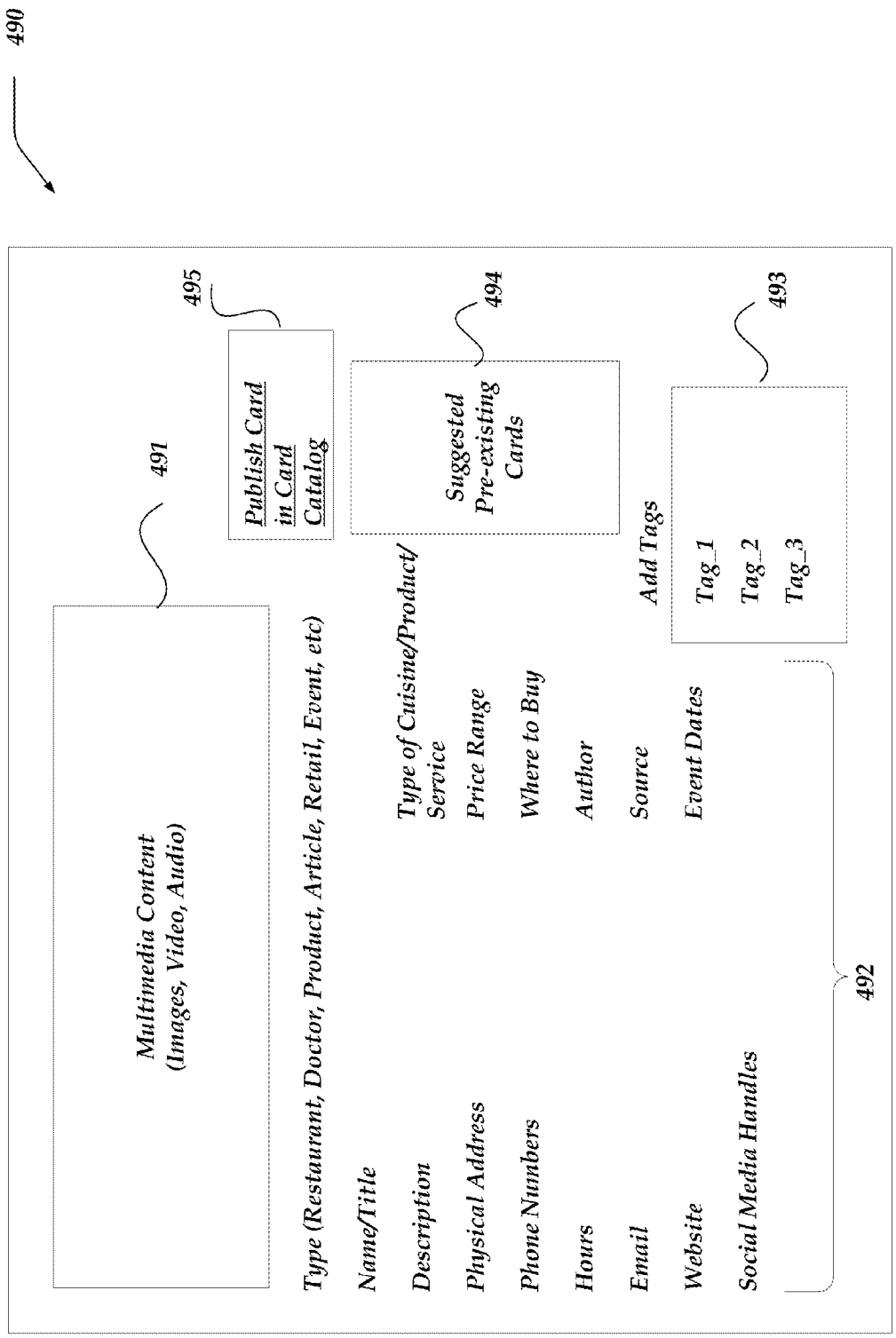
FIG. 4D shows one exemplary embodiment of a user interface that enables a user to generate a card, as well as publish, save, share, or tag the card, in accordance with at least a portion of the various embodiments.

The following discussion is in conjunction with FIGS. 4A-4D. FIG. 4A shows one exemplary embodiment of a card network 400 that is consistent with at least one of the various embodiments. FIG. 4B shows one exemplary embodiment of a user interface 460 that provides a user access to a user card catalog, in accordance with at least a portion of the various embodiments. FIG. 4C shows one exemplary embodiment of a user interface 480 that provides a user a card and enables the user to publish, save, share, or tag the card, in accordance with at least a portion of the various embodiments. FIG. 4D shows one exemplary embodiment of a user interface 490 that enables a user to build a card, as well as publish, save, share, or tag the card, in accordance with at least a portion of the various embodiments;

In general, a platform, such as but not limited to OSR platform 140 of FIG. 1, may include a plurality of cards that are directed to a plurality of subjects. Cards with equivalent, or at least similar subjects, may be organized in a coupled card network also included in the platform and based on associations between the cards and one or more users of the platform. The plurality of cards and card networks included in the platform may be referred to as the card-sphere of the platform.

By generating specific associations with a card, a user of the platform may endorse the card, or endorse other cards that are directed to an equivalent, or at least a similar, subject. By endorsing a card, the user may provide a recommendation or referral of the card or the subject of the card to at least a portion of the other users of the platform. The user may determine which other users are provided access to view which cards the user has endorsed via user settable privacy parameters.

The platform may enable each of the users to generate an association with other users by sending and responding to friend requests over the platform. As such, each user may friend at least a portion of the other users to generate an association with the other users. Such associations are employed to generate a social network and a graph corresponding to the social network. According, an N-degree relationship exists between each pair of users of the platform, where N may be a positive integer between 1 and the total number of users of the platform or infinite. N may indicate the minimum number of node hopes, within the graph corresponding to the social network, required to traverse from one user of the pair to the other user of the pair.

For instance, for two friends, a 1-degree relationship exists. For a pair of users that are not friends, but one of the users is a friend of a friend of the other user, a 2-degree relationship exists for the two users. Similar N-degree relationships may exist for other pairs of users that are less connected in the social network, i.e. N is greater than 2. A particular pair of users may be referred to as an N-degree pair of users. Depending on the specific details of the social network, at least one pair of users may be completely unconnected and no amount of node hops along the graph may connect the pair of users. Such pairs of users may be referred to as a completely unconnected pair of users or an infinite-degree pair of users. In various embodiments, a degree of connectivity between a pair of two users may refer to the N, or N-degree relationship associated with the pair.

Users may be enabled to access of least a portion of the card features for at least a portion of the cards included in the card-sphere. One card feature that a user may be enabled to access is the card tallies of the card that are specific to the user. The card tallies that are specific to the user provide the user with an overview of at least the number of other users that have endorsed the card, or at least another card with an equivalent or similar subject. In some embodiments, the card tallies specific to the user provide the user with the number of the user's friends that have endorsed the card, the number of friends of friends that have endorsed the card, and the number of other users that have endorsed the card. Thus, the card tallies specific to the user enables the user to determine a utility of the card based on how many other users have endorsed the card, as well as the N-degree relationship the user has with at least a portion of the other users that have endorsed the card.

Each of the users may be enabled to generate and access cards that they have generated. In various embodiments, users may be enabled to access at least a portion of the cards generated by at least a portion of the other users. When accessing a card, the user may be provided at least a portion of the content or data included in the card. That is to say, the user may be provided with at least a portion of the card features, including but not limited to the card tallies that are specific to the user. Each of the users may also be enabled for generate an association with cards, including cards that the user has generated, as well as cards that other users have generated.

Each of the users may be provided with one or more user card catalogs to publish and/or save cards in user card collections included in the one or more user card catalogs. In various embodiments, publishing or saving a card in one or more user card collections of the user generates an association of the card with the user. For instance, user interface (UI) 460 of FIG. 4B shows User_A card catalog 462 owned by User_A of the platform.

Each of the users of the platform may be enabled to generate, delete, edit, name, or otherwise manage card collections included in the user's card catalog. UI 460 shows a plurality of card collections included in User_A card collections 464. For instance, User_A has generated an Activities card collection and published 10 cards with the Activities card collection. Accordingly, the 10 cards within the Activities card collection are associated with at least User_A. As discussed further below, card networks of the platform enable a card, or at least cards with an equivalent or similar subject, to be associated with a plurality of users. As shown in FIG. 4B, other card collections that include published cards are included in User_A card collections 464. User_A may be the owner of User_A card catalog 462 and User_A card collections 464.

In various embodiments, the user may set, edit, or otherwise manage one or more privacy parameters associated with the user's card catalog, each of the card collections in the user's card catalog, and/or each of the individual cards published in the user's various card collections. The privacy parameters may indicate which, if any, other users, of the platform may be provided an indication that a particular card has been published or saved in at least one of the user's card collections. Accordingly, as discussed herein, the privacy parameters may determine which users are provided knowledge that a particular user has endorsed a card. A particular user may set one or more privacy parameters to indicate the minimum N-degree relationship that must exist between the user and another user, such that the other user may be provided an indication that a particular card has been published in at least one of the user's card collections.

A user may endorse a card by publishing the card in one or more of the user's card collections. Furthermore, to endorse the card, the one or more privacy parameters associated with the one or more card collections (or the particular card) must indicate that at least one other user of the platform may be provided an indication that the card was published in one or more card collections of the user. When both conditions are satisfied, the user has effectively endorsed the card and/or the subject of the card. By endorsing a card, the user may provide a personal endorsement or referral of either the subject of the card, the information provided by the card, or the like, to other users that are enabled, via privacy parameters set by the user, to be provided an indication that the user has endorsed the card.

Another card feature included with cards are card tallies. A card includes one or more card tallies that are specific to each user of the platform. A card tally of a card specific to a particular user may be an N-tuple of tallies or scores for the card with respect to the particular user. Each score in the N-tuple of scores corresponds to a metric based on the number of N-degree users (with respect to the particular user) that have endorsed the card. In at least one embodiment, the scores may be integers that correspond to the number of other users that have endorsed the card. In other embodiments, users may be weighted such that the scores may be non-integer scores.

In one exemplary, but non-limiting embodiment, a card may include a separate card tally specific to each user that includes a 3-tuple. The first score in the 3-tuple specific to a particular user may indicate the number of friends (1-degree users) of the particular user that have endorsed the card. The second score in the 3-tuple may indicate the number of friends of friends (2-degree users) of the particular user that have endorsed the card. The third score in the 3-tuple may indicate the number of other users that have endorsed the card, where other users are users of the platform that are not 1-degree users (with respect to the particular user) and are not 2-degree users (with respect to the particular user).

In such an exemplary embodiment, a card may include a card tally for a particular user that is represented as the 3-tuple (5, 18, 123). Such a card tally specific to the particular user indicates that 5 of the particular user's friends have endorsed the card (or a card with an equivalent or similar subject), 18 friends of the particular user's friends have endorsed the card, and 123 other users of the platform have endorsed the card. As discussed further below, when the particular user views at least a portion of the card features of the card, the card tally for the particular user may be provided to the particular user. As such, the provided card tally enables the particular user to determine a utility of the card based on the number of the user's friends that have endorsed the card, the number of friends of friends that have endorsed the card, and the number of other users that have endorsed the card.

It should be understood that various embodiments of card tallies are not limited to 3-tuples, and card tallies are generalizable to any appropriate N-degree relationships between users. For instance, in some embodiments, card tallies may include a 4-tuple that indicates the number of endorsements from friends, friends of friends, friends of friends of friends, and others. A user may configure which tallies to present via a user profile configuration. Card tallies for a particular card and for a particular user are at least partially determined based on the one or more card networks. Card tallies and card networks are discussed further below.

Turning the attention UI 460 of FIG. 4B, User_A may set privacy parameters such that any user of the system may be granted viewing or read access to User_A's Restaurant card collection 466. When another user, such as User_Y, views User_A card catalog 462 via UI 460 as described below, User_Y may be provided an indication that User_A has endorsed Restaurant_A card 470, Restaurant_B card 472, and Restaurant_C card, as shown in FIG. 4B. In various embodiments, Restaurant card collection 466 may be a public card collection because each other user of the platform may be given at least an indication of which cards User_A has published in Restaurant card collection 466 (and endorsed) by viewing Regarding the Travel card collection, User_A may set privacy parameters indicating that only User_A's friends (1-degree relationship) may be granted viewing access and view which cards User_A has endorsed by publishing the card in User_A's Travel card collection. Because only a limited portion of the users may be given at least an indication of which cards User_A has published in Travel card collection (and endorsed), Travel card collection may be a limited card collection. Privacy parameters for limited card collections may be set for other N-degree relationships, such as 2-degree (friends of friends) relationships, 3-degree (friends of friends of friends), or any other valid value for N.

In contrast, User_A may set privacy parameters for some card collections such that no other user other than User_A may view which cards are published or saved in that card collection. For instance, User_A may set one or more privacy parameters for User_A's Yoga card collection such that no other user may view the Yoga card collection of UI 460. Yoga card collection may be referred to a private card collection because only the owner of the collection may be granted viewing access of the collection. As such, User_A has not endorsed any cards saved or published in the Yoga card collection, unless the cards are also published in a non-private card collection of User_A. In at least one embodiment, only the owner of a private collection is provided a display of the private collection via a user interface, such as but not limited to UI 460. For instance, when User_Y is viewing User_A card catalog 462 via UI 460, the Yoga card collection would not be shown, as it is in FIG. 4B.

In at least one embodiment, the user that owns the user card catalog may have full viewing and editing access to the user's card catalog, the card collections included in the card catalog, and the cards published in the card collections. In various embodiments, each card catalog includes a private collection referred to as the Unfiled collection. A user may save cards in the user's private Unfiled collection, without endorsing the cards. Other users of the platform are not provided an indication of which cards are saved in the user's Unfiled collection or any other private collection included in the user's card catalog.

In at least one embodiment, although a card is saved in a private or limited collection of a particular user, other users, such as those not provided access to the limited collection, may view or otherwise be provided access to at least a portion of the card without an indication that the card is saved in a private or limited collection of the particular user. As discussed throughout, and in at least in conjunction with FIG. 4A below, card networks are generated based on the association of cards with users. Each card in a particular network is directed to an equivalent, or at least similar a subject. Users may be enabled to access at least one card in a particular network, but may not be provided with the associations between the cards and the users, as indicated by the card network.

In regards to UI 460, when a user that is provided viewing access of User_A card catalog 462, via user privacy parameters, selects a particular user card collection within the card catalog, the user may view at least a portion of the cards published in the selected collection. For instance, User_Y, via UI 460, has selected the Restaurant card collection 466. Upon selection, Restaurant card collection 466 expands to provide User_Y access to at least a previewing mode of the three cards 468 published in Restaurant card collection 466: Restaurant_A card 470, Restaurant_B card 472, and Restaurant_C card 474. In at least one embodiment, User_A may set privacy parameters to indicate which other users may be provided full viewing accessing of each of Restaurant_A card 470, Restaurant_B card 472, and Restaurant_C card 474. As such, User_A has publically endorsed each of Restaurant_A card 470, Restaurant_B card 472, and Restaurant_C card 474.

As shown in FIG. 4B, UI 460 also provides a user a search function 476 to perform keyword search over cards, collections, users, and the like included in the card-sphere. UI 460 also provides a user with filter functionally and sorting functionality 478 to filer and sort the search results, as well as the display of User_A card catalog 462.

When a user that is provided viewing access, via privacy parameters, selects a particular card published in a card collection, the user may view at least a portion of the content, data, or card features included in the selected card. For instance, when User_Y selects, via UI 460, the Restaurant_A card 470, the preview mode of Restaurant_A card 470, shown in FIG. 4B, may be transitioned to another view shown in UI 480 of FIG. 4C.

UI 480 of FIG. 4C shows at least a portion of the content, data, or card features included in Restaurant_A card 481. In at least one embodiment, the view of Restaurant_A card 481 may be arranged to visually simulate or resemble at least a portion of a physical business card. For instance, Restaurant_A card 481 may include a front side and a backside. The front side of Restaurant_A card 481 is shown in UI 480. As such, the card features of Restaurant_A card 481 that are displayed on the front side of the card include image data 482, a map 482 of the location of Restaurant_A, and other data fields 484 including but not limited to Type, Name, Description, Address, Website URL, Price Range, Houses, and the like.

A user may be enabled to flip Restaurant_A card 481 to display the backside of the card by selection the "Click Here for Special Offer" button 485 embedded on the card. In various embodiments, the backside of the card may be protected, or otherwise reserved such that only the subject of the card may generate or otherwise provide content for the backside of the card. Accordingly, the card features or content that is included on the backside of the card may be subject content. For instance, Restaurant_A may provide a coupon or other offer to be displayed on the backside of Restaurant_A card 481. In such embodiments, the user must actively select to view the backside of a card to view and/or redeem the special offer. The platform may track the number of views of the backside of a card.

As shown in UI 480 of FIG. 4C, User_Y is viewing Restaurant_A card 481. Card features of a card when be viewed by a particular user, such as User_Y, may include card the tallies specific to the particular user. UI 480 is displaying the card tallies 486 for Restaurant_A card 481 that are particular to User_Y. The card tallies 486 particular to User_Y are represented by a non-limiting 3-tuple (5, 18, 123). The 3-tuple indicates that 5 of User_Y's friends have endorsed Restaurant_A card 481, 18 friends of the User_Y's friends have endorsed Restaurant_A card, and 123 other users of the platform have endorsed Restaurant_A card 481. When another user views Restaurant_A card 481, via UI 480 or another UI, a separate N-tuple of scores representing the card tallies specific the other user may be presented to the other user.

User_Y may have located Restaurant_A card 481 via another user (such as UI 460 of FIG. 4B), searched for the card using a search functionality of the platform, another user may have specifically shared the card with User_Y via a beacon, or any other such mechanism.

UI 480 provides the user with various options. For instance, the user may view recommendations, reviews, or comments regarding or associated with the card or the subject of the card that provided by other users. As shown, User_Y is viewing the recommendations for Restaurant_A card 481 via recommendation window 487. As discussed herein, users may be enabled to generate or otherwise provide recommendations, reviews, or comments regarding the card. The content provided in recommendation window 487 may be arranged such that User_Y can view the recommendations provided by User_Y's friends (such as User_A and User_B). User_Y can also review recommendations provided by the friends of User_Y's friends, such as User_E. In at least one embodiment, the recommendations provided by other users may be shown in recommendation window 487. A user may configure to what N-degree relationships to organize within recommendation window.

A user of UI 480 may generate an association with Restaurant_A card 481. For instance, User_Y may publish Restaurant_A card 481 in User_Y's card catalog via buttons 488. User_Y mare share Restaurant_A card 481 with other users or save the card to one or more clipboards owned and managed by User_Y, via buttons 488. User_Y may view tags for Restaurant_A card 481 via buttons 488.

Figure 11:
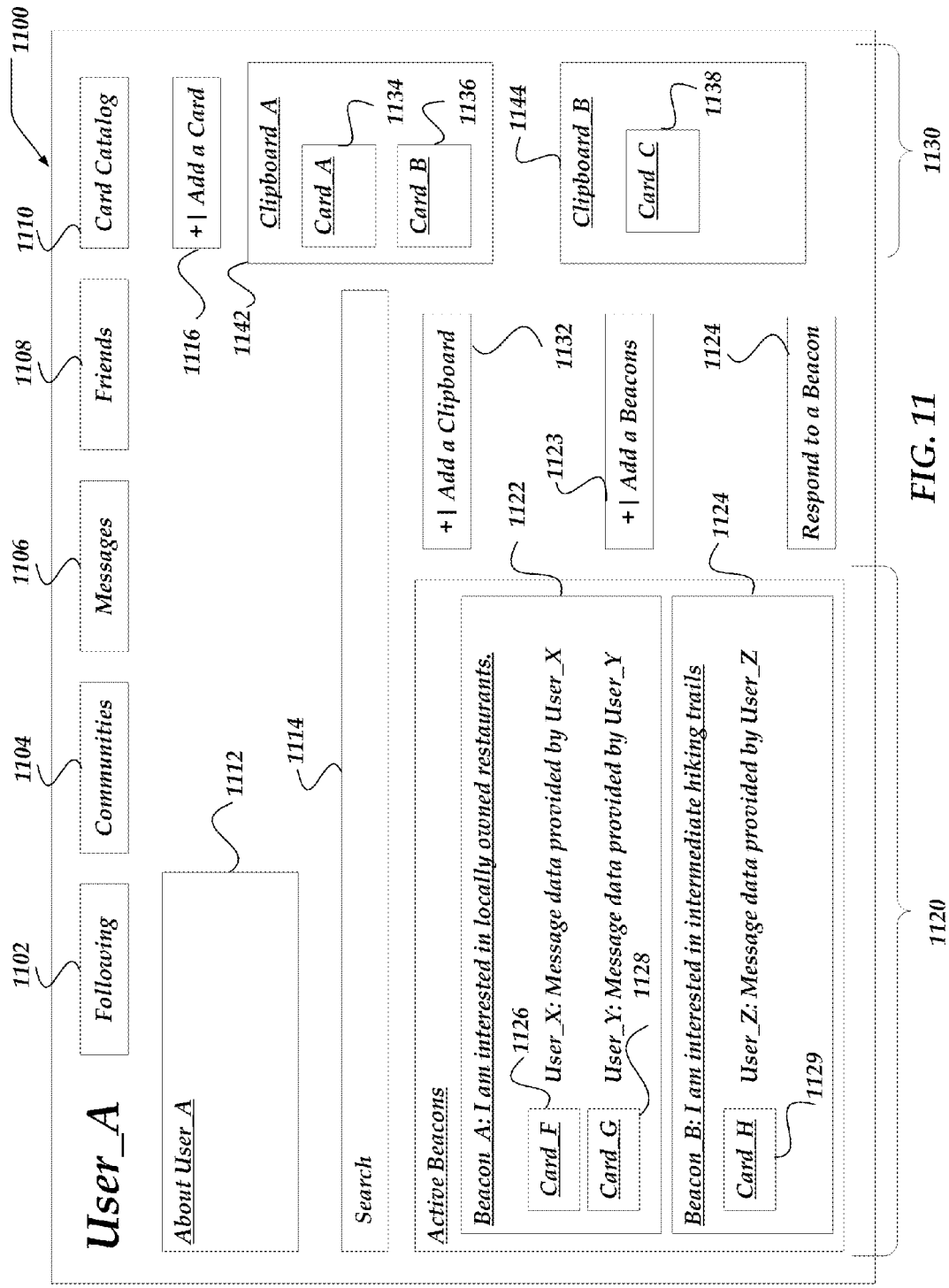
FIG. 11 shows one exemplary embodiment of a user interface that enables a user to interact with a platform that is in accordance with at least a portion of the various embodiments.

As discussed in conjunction with at least UI 1100 of FIG. 11, the platform may provide a user with one or more card clipboards 1130 accessible via UI 1100. A user may be enabled to add a card to a card clipboard 1130 by dragging and dropping a card into one or more of the clipboards 1130. At least one of the various UIs discussed herein may enable a user to add a card to one of the user's card clipboards via an add a card to a clipboard button. One or more cards may be stored in a card clipboard for later access. For instance, when viewing cards published by other users, a user may add a particular card to one of the user's card clipboards, including but not limited to Clipboard_A 1142 or Clipboard_B 1144. A user may later publish a card stored within one of their clipboards 1130, such as but not limited to Card_A 1134, Card_B 1136, or Card_C 1138, in the user's card catalog. A user may add another card to the user's card clipboards 1130, for later access, without publishing or endorsing the card. The user may be enabled to add, name, and/or rename a card clipboard via the add a clipboard button 1132.

As discussed above, card networks at least partially enable the determination of card tallies for various users of the platform. Card networks, such as exemplary but non-limiting card network 400 of FIG. 4A, are generated based on associations between users of the platform and cards of the card-sphere of the platform. In the various embodiments, when a user is associated with a card, such as when the user publishes a card in one or more card collections of the user's card catalog, or at least saves a card in the user's unfiled card collection, a card network for that card indicates the association. Card network 400 indicates such an association for a card and at least a portion of the users of the platform that are associated with the card.

Generally, a card network includes a global card and one or more user cards that are coupled to the global card. The subject of the global card may be equivalent to, or at least similar to the subject of each of user cards in the card network. As such, a card network may be associated with one or more subjects of the cards included in the card network. Each card subject in the card-sphere may be associated with one or more card networks. For example, the subject of one or more cards included in the card-sphere may be Restaurant_A and the subject of one or more other cards in the card-sphere may be Restaurant_B. Accordingly, Restaurant_A may be associated with a card network that includes one or more cards with Restaurant_A as the subject, and Restaurant_B may be associated with a separate card network that includes one or more other cards with Restaurant_B as the subject.

Each user card in a card network corresponds to a user that has formed an association with a card that is directed to an equivalent, or at least similar, subject as the subject of the global card. Thus, the card network associated with Restaurant_A may include user cards that are directed to Restaurant_A, as well as users that are associated with the user cards that are directed to Restaurant_A. In a card network, the global card is at least loosely coupled to the user cards, such that when global card features of the global card are added, removed, updated, edited, or otherwise varied, at least a portion of the corresponding user card features included in the user cards may be selectively synchronized to reflect the varied global card features. Thus, if an address of Restaurant_A is updated in the global card features, the address of Restaurant_A may be updated to indicate the new address of Restaurant_A in the user cards included in the card network. Accordingly, at least a portion of user card features of the user card within a card network may be automatically or manually updated to replicate at least a portion the global card features of the global card.

Specifically, card network 400 includes a global card 402 and one or more user cards, such as User_A card 412 and User_B card 422. Card network 400 includes additional user cards User_C card, 432 User_D card 442, and User_E card 452. Other card networks may include more or less user cards.

Card network 400 also includes users, such as but not limited to User_A 410, User_B 420, User_C 430, User_D 440, and User_E 450. As discussed throughout, one or more user cards may be associated with one or more of the users included in in card network 400. For instance, User_A card 412 is associated with User_A 410 and User_B card 422 is associated with User_B 420. Likewise, User_C card 432 is associated with User_C 430, User_D card 442 is associated with User_D 440, and User_E card 452 is associated with User_E 450.

The subject of global card 402 is equivalent to, or at least similar, to each of the user cards included in card network. Accordingly, global card 402 includes a subject that is common to each of the user cards included in card network 400. For instance, the subject of global card 402 and each of User_A card 412, User_B card, 422, User_C card 432, User_D card 442, and User_E card 452 may be a particular restaurant, such as Restaurant_A. Thus, card network 400 may be a card network for Restaurant_A.

Global card 402 includes global card features 404. Global card features 404 may include any content or data included in global card 402, such as but not limited to data fields (type, name, address, phone numbers, website URL, and the like), multimedia content (image data, audio data, and the like), tags, and the like. Global card features 404 may include content or data relating to or regarding the common subject (Restaurant_A) of global card 402 and each of the user cards included in card network 400.

Similarly, each of the user cards includes user card features. For example, User_A card 412 includes User_A card features 414, User_B card 422 includes User_B card features 424, User_C card 432 includes User_C card features 434, User_D card 442 includes User_D card features 444, and User_E card 452 includes User_E card features 454. Similar to global card features 404, the user card features of each of the user cards may include content or data relating to or regarding the common subject (Restaurant_A) of global card 402 and each of the user cards included in card network 400.

As further discussed herein, in various embodiments, because global card 402 is at least loosely coupled to each of the other cards included card network 400, at least a portion of the user card features may be equivalent to, or at least similar to, global card features 404 of global card 402.

As discussed throughout, a user card may be associated with a user in response to the user publishing a card in one or more card collections in the user's card catalog. Accordingly, in some embodiments, card network 400 may include at least a reference to one or more card collections within a user card catalog that the user card is published in for at least a portion of the included users. For instance, User_A card 412 may be published in User_A collections 416, User_B card 422 may be published in User_B collections 426, and User_C card 432 may be published in User_C collections 436. Likewise, User_D card 442 may be published in User_D collections 446 and User_E card 452 may be published in User_E collections 456. Note that in at least some embodiments, at least one of the user cards included in card network 400 may not be published in one or more card collections of the associated user. In such embodiments, the user collections may not be included for that user card in card network 400. Cards saved in a private collection of a user, including but not limited to the user's Unfiled card collections, may be included in a card network.

As discussed above, user settable one or more privacy parameters may be associated with each user card included in card network 400. A user may indicate various privacy parameters for the cards published in the user's card catalog, saved in the user's unfiled collection, or otherwise associated with the user. The privacy parameters may indicate which, if any, other users of the platform, may be provided an indication that a particular user is associated with a card within the card network.

As such, User_A privacy parameters 418 may be associated with User_A card 412, User_B privacy parameters 428 may be associated with User_B card 422, and User_C privacy parameters 438 may be associated with User_C card 432. Similarly, User_D privacy parameters 448 may be associated with User_D card 442 and User_E privacy parameters 458 may be associated with User_E card 452. The user privacy parameters associated with a user card may be provided by the user associated with the associated user card.

In some embodiments, card network 400 may be loosely coupled replication (LCR) network, as indicated by the connections between global card 402 and each of the user cards included in card network 400. As discussed herein, an LCR network may enable the replication of at least a portion of the card features included in a card within the LCR network in one or more other cards included in the LCR network. For instance, User_A may edit User_A card features 414. Based on the coupling between User_A card 412 and global card 402, the updates to User_A card features 414 may be replicated in global card features 404. Furthermore, the updates to global card features 404 may be replicated in at least a portion of the other user card features, such as but not limited to User_B card features 424 based on the coupling between global card 404 and User_B card 422.

UI 490 of FIG. 4D enables a user to generate a card, as well as publish, save, share, or tag the card. For instance, User_A may employ UI 490 to generate Restaurant_A card 481, as provided to User_Y via UI 480 of FIG. 4C. Accordingly, UI 490 may be a card builder or a card generating UI.

A user of UI 490 may provide various card features corresponding to various predefines or dynamically determined card via data fields 492. Such data fields may include, but are not otherwise limited to type, name, or title. For instance, the user may provide a type for the card, such as but not limited to restaurant, doctor, product, article, retail, event, blog, and the like. The user may also provide a name or title for the card.

As shown in UI 490, other data fields may be provided by a user of the UI 490, such as but not limited to physical address, phone numbers, hours, email address, website URL, social media identifiers, type of cuisine/product/service, price range, where to buy, author, source, event dates, and the like. A selection of possible data fields provided to a user via UI 490 may be dynamically determined based on card features provided by the user, such type, name, or title. For instance, if the user provides article for the card feature corresponding to type, UI 490 may not provide the user with the hours data field.

As the user provide card content, data, or card features via UI 490, one or more pre-existing cards may be dynamically determined and suggested to the user based on the provided card features, via suggested pre-existing cards preview window 494. For instance, if User_A provides "Restaurant" as the type and "Restaurant_A" as a title to a card being generated, and a card that is already existing within the card-sphere is directed to the subject of Restaurant_A, the pre-existing card may be recommended to User_A. If this is the subject that User_A is interested in generating a card for, User_A may select one of more of the suggested pre-existing cards. Accordingly, the platform may dynamically suggest pre-existing cards within the card-sphere that are directed to an equivalent, or at least a similar subject, based on the card features provided by the user. As the user provides more card features, the suggested pre-existing cards become more filtered and directed to the subject that the user is generating a card for. In this way, the platform reduces the replication of multiple cards for a single or a group of similar subjects. If the user declines to select, or otherwise does not select, one of the suggested pre-existing cards, the user may continue to provide additional card features to include with the card being generated.

A user may be enabled to provide card features by dragging and dropping multimedia content, such as but not limited to image data, video data, audio data, and the like, into multimedia content drop box 491. In other embodiments, the user may be enabled to provide multimedia content to include with the card via other mechanisms, such as but not limited to a file browser.

The user may be enabled to provide one or more tags to include as card features via tagging window 493. The user may be enabled to publish the card in one or more of the user's card collections via publish button 495. In some embodiments, the user may be enabled to share the card with other users, such as by providing a response to a beacon, or the like via UI 490 or a similar UI.

Generalized Operations

The operation of certain aspects of the invention will now be described with respect to FIGS. 5-10. In at least one of various embodiments, processes 500, 600, 620, 700, 800, 900, and 1000 described in conjunction with FIGS. 5-10, respectively, or portions of these processes may be implemented by and/or executed on a network computer, such as network computer 300 of FIG. 3. In other embodiments, these processes or portions of these processes may be implemented by and/or executed on a plurality of network computers, such as network computer 300 of FIG. 3. Further, in other embodiments, these processes or portions of these processes may be implemented by and/or executed on one or more mobile computers, such as mobile computer 200 as shown in FIG. 2. Also, in at least one of the various embodiments, these processes or portions of these processes may be implemented by and/or executed on one or more cloud instances operating in one or more cloud networks. However, embodiments are not so limited and various combinations of network computers, client computer, cloud computer, or the like, may be utilized. These processes or portions of these processes may be implemented on any computer of FIG. 1, including, but not limited to user computers 102-108 or any computer included in OSR platform 140, such as CSC 110, BSC 120, or SRSC 130.

Figure 5:
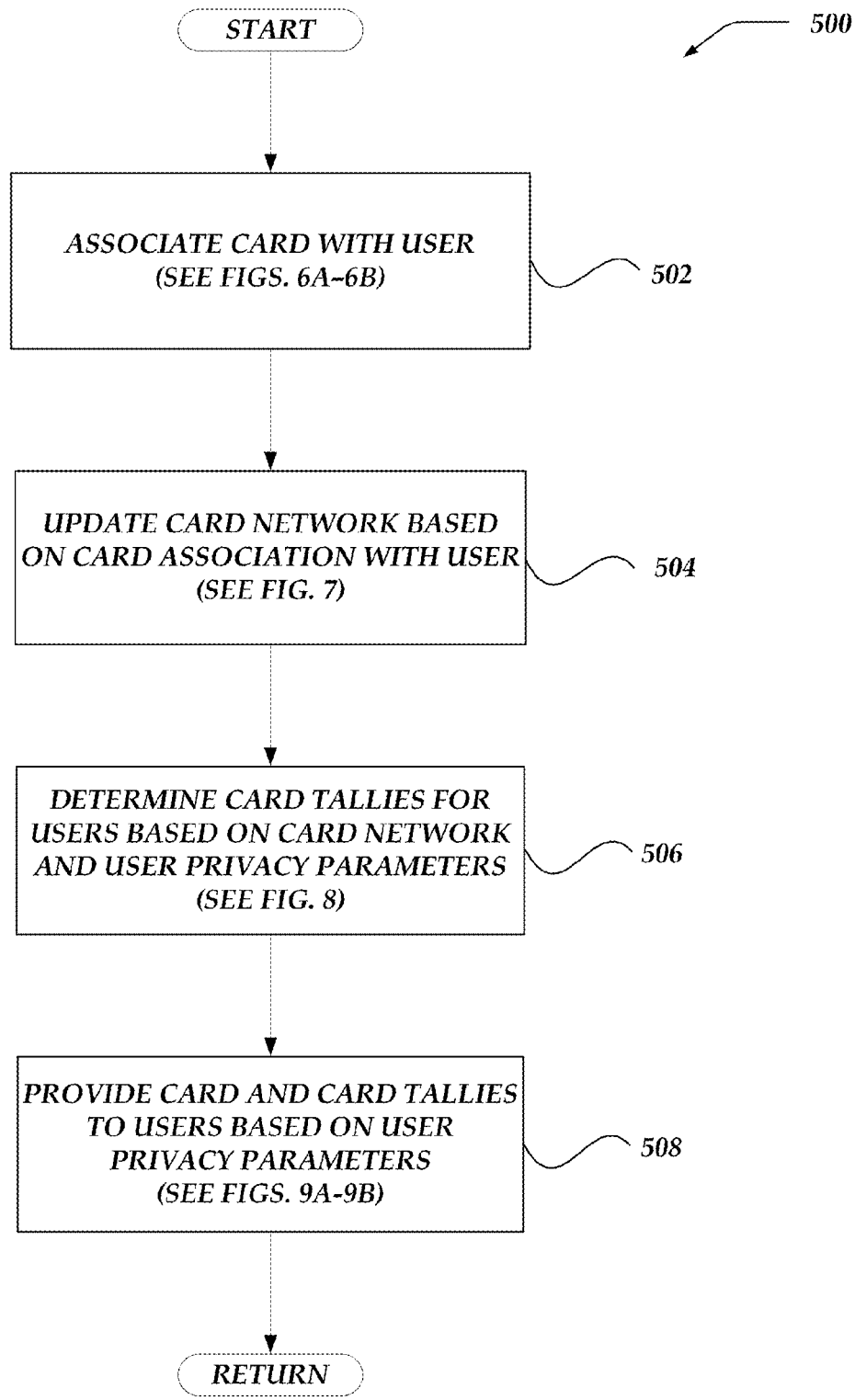
FIG. 5 shows an overview flowchart for a process to provide a card to users, in accordance with at least one of the various embodiments.

FIG. 5 shows an overview flowchart for a process to provide a card to users of a platform, in accordance with at least one of the various embodiments. After a start block, process 500 begins at block 502, where a card is associated with a user. Various embodiments of associating a card with a user are discussed in at least conjunction with process 600 and process 620 of FIG. 6A and FIG. 6B respectively. However briefly, at block 502, a card is associated with a user of a platform, such as but not limited to OSR platform 140 of FIG. 1. In at least one embodiment, the user may be a user of a user computer, such as but not limited to any one of user computers 102-108 of FIG. 1.

In various embodiments, a card is associated with a user at least when the user publishes or saves the card in the user card catalog owned by the user. For instance, as shown in UI 420 of FIG. 4B, User_A has published Restaurant_A card 470 in the User_A card catalog 462. More specifically, User_A has published Restaurant_A card 470, as well as Restaurant_B card 472 and Restaurant_C card 474, in the User_A's Restaurant card collection 466 in the User_A card catalog 462. When User_A publishes the Restaurant_A card 470 in User_A card catalog 462, the Restaurant_A card 470 is associated with User_A.

In some embodiments, when a user saves a card in the user's private Unfiled collection, the card is associated with the user. A card may be associated with a user when the user shares the card with another user, publishes the card in a user community's card collection, responds to a beacon by sharing the card, and the like. As discussed herein, the card that is associated with the user may be a user card. In at least one embodiment, when a user publishes or saves a card in the user's card catalog, a user card, such as any of the user cards of card network 400 of FIG. 4A is associated with the user. For instance, User_A card 412 of card network 400 is associated with User_A. The association of the card with the user may be based on one or more privacy parameters provided by the user. By generating specific associations with a card, a user of the platform may endorse the card, or endorse other cards that are directed to an equivalent, or at least a similar, subject.

Process 500 flows to block 504, where a card network is updated. Various embodiments for updating a card network are discussed in at least conjunction with process 700 of FIG. 7. However briefly, at block 504, a card network, corresponding to the card associated with the user at block 502, is updated based on the card's association with the user.

As shown in FIG. 4A, a card network, such as card network 400 may include a global card, such as global card 402, and one or more user cards, such as User_A card 412. In an exemplary embodiment, card network 400 is updated to include User_A card 412 and User_A. As discussed herein, at least a portion of global card features 404 of global card 402 of network 400 may be updated based on the User_A card features 414 of User_A card 412. In at least one embodiment, the card network is updated based on one or more privacy parameters corresponding to the user's association with the card.

Process 500 flows to block 506, where card tallies for the card are determined. Various embodiments for determining card tallies are discussed in at least conjunction with process 800 of FIG. 8. However briefly, at block 506, card tallies for the card may be determined for the user and other platform users based on the updated card network and the user privacy parameters.

As discussed herein, card features for a card include one or more card tallies that are specific to each user of the platform. A card tally of a card specific to a particular user may be an N-tuple of scores for the card with respect to the particular user. Each score in the N-tuple of scores corresponds to a metric based on the number of N-degree users (with respect to the particular user) that has endorsed the card. In at least one embodiment, the scores may be integers that correspond to the number of other users that have endorsed the card. In other embodiments, users may be weighted such that the scores may be non-integer scores.

In one exemplary, but non-limiting embodiment, a card may include a separate 3-tuple card tally for each user. The first score in the 3-tuple specific to a particular user may indicate the number of friends (1-degree users) of the particular user that have endorsed the card. The second score in the 3-tuple may indicate the number of friends of friends (2-degree users) of the particular user that have endorsed the card. The third score in the 3-tuple may indicate the number of other users that have endorsed the card, where other users are users of the platform that not 1-degree users (with respect to the particular user) and are not 2-degree users (with respect to the particular user).

In such an exemplary embodiment, a card may include a card tally for a particular user that is represented as the 3-tuple (5, 18, 123). Such a card tally specific to the particular user indicates that 5 of the particular user's friends have endorsed the card (or a card with an equivalent or similar subject), 18 friends of the particular user's friends have endorsed the card, and 123 other users of the platform have endorsed the card.

It should be understood that various embodiments of card tallies are not limited to 3-tuples, and card tallies are generalizable to any appropriate N-degree relationships between users. For instance, in some embodiments, card tallies may include a 4-tuple that indicates the number of endorsements from friends, friends of friends, friends of friends of friends, and others. A user may configures which tallies to present via a user profile configuration.

Process 500 proceeds to block 508, where the card is provided to users of the platform. Various embodiments for providing cards to users are discussed in at least conjunction with process 900 of FIGS. 9A-9B. However briefly, at block 508, at least a portion of the card features of the card may be provided to other users of the platform based on the user's one or more privacy parameters. In at least one embodiment, at least a portion of the card tallies specific to another particular user are provided to the particular user. For instance, User_A may have endorsed the card at block 502. Tallies for the card, which are specific to User_Y, may be determined at block 506. Tallies specific other users may also be determined at block 506. The tallies that are specific to User_Y may be provided to User_Y at block 508.

In an exemplary embodiment, UI 480 of FIG. 4C shows at least a portion of the content, data, or card features included in Restaurant_A card 481 being provided to User_Y. Restaurant_A card 481 card features being displayed to User_Y may include, but are otherwise not limited to image data 482, a map 482 of the location of Restaurant_A, and other data fields 484 including but not limited to Type, Name, Description, Address, Website URL, Price Range, Houses, and the like.

As shown in UI 480 of FIG. 4C, at least a portion of the card features provided to a particular user, such as User_Y, may include the card tallies that are specific to the particular user (User_Y). UI 480 may be employed to provide at least a portion of the card features of Restaurant_A to User_Y, including the card tallies that are specific to User_Y. For example, in FIG. 4C, UI 480 is shown displaying the card tallies 486, which are specific to User_Y, for Restaurant_A card 481. The card tallies 486 particular to User_Y are represented by a non-limiting 3-tuple (5, 18, 123). The 3-tuple indicates that 5 of User_Y's friends have endorsed Restaurant_A card 481, 18 friends of the User_Y's friends have endorsed Restaurant_A card, and 123 other users of the platform have endorsed Restaurant_A card 481. When another user is provided Restaurant_A card 481, via UI 480 or another UI, a separate N-tuple of scores representing the card tallies specific the other user may be presented to the other user. Process 500 may terminate and/or returns to a calling process to perform other actions.

Figure 6A:
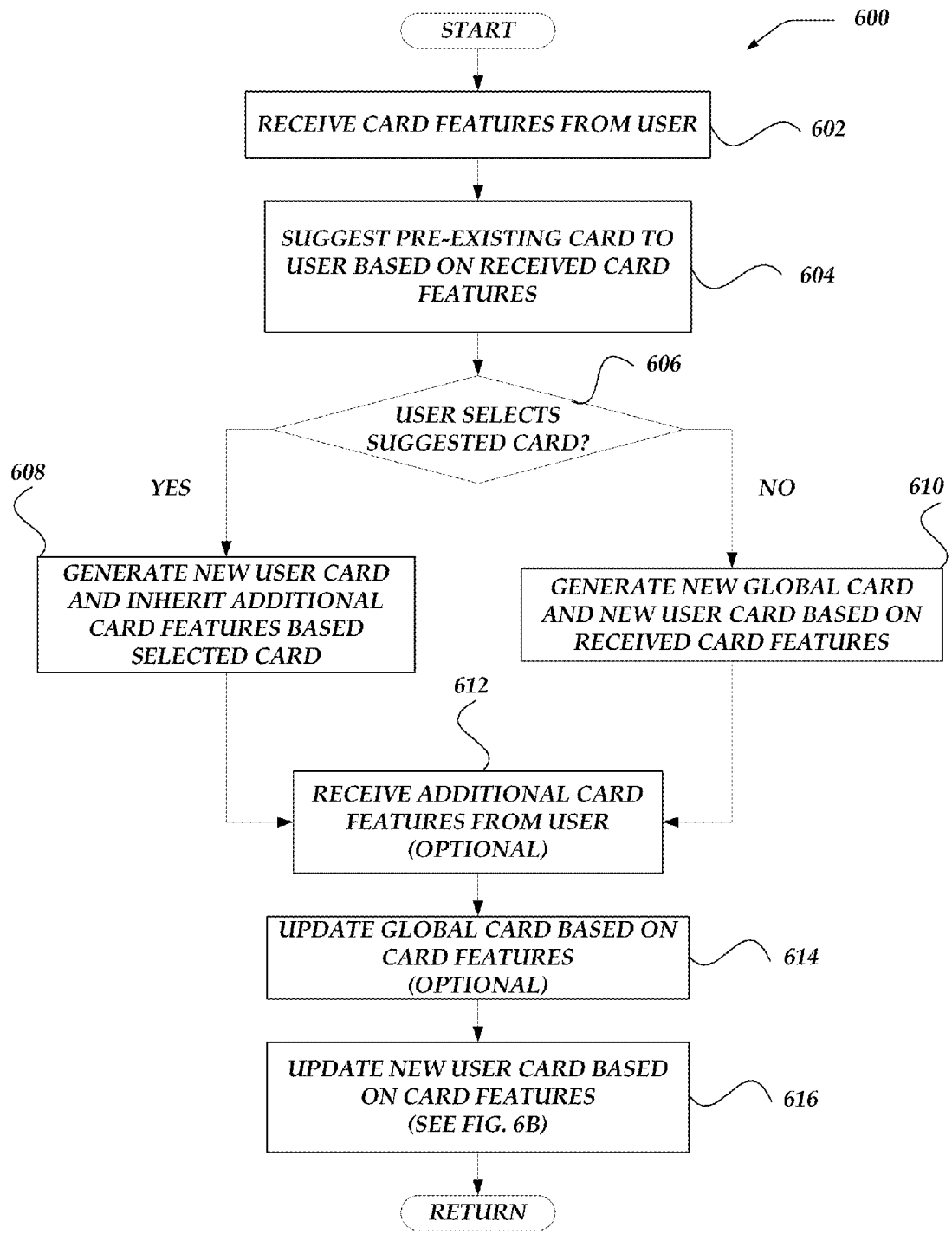
FIG. 6A shows an overview flowchart for a process to generate a card, in accordance with at least one of the various embodiments.

FIG. 6A shows an overview flowchart for a process to generate a card, in accordance with at least one of the various embodiments. At least a user card may be generated, such as User_A card 412 of card network 400 of FIG. 4A may be generated via process 600 of FIG. 6A. In at least one embodiment, a global card, such as global card 402 of card network 400 may also be generated via process 600. A UI, such as UI 490 of FIG. 4D may at least partially enable a user to generate a card, based on a process that is consistent with process 600 of FIG. 6A. After a start block, at block 602, at least a portion of the card features may be received from the user. For instance, a user may provide at least a type for the card, such as but not limited to restaurant, doctor, product, article, retail, event, blog, and the like. The user may also provide a name or title for the card.

In various embodiments, the plurality of cards and card networks included in the platform may be referred to as the card-sphere of the platform. At block 604, one or more pre-existing cards within the card-sphere may be suggested to the user based on the card features received at block 602. The one or more suggested pre-existing cards may be provided to the user via the pre-existing cards preview window 494 of UI 490. For instance, if a user provides "Restaurant" as the type and "Restaurant_A" as a title to a card being generated, and a card that is already existing within the card-sphere is directed to the subject of Restaurant_A, the pre-existing card may be recommended to the user at block 604. Accordingly, the platform may dynamically suggest pre-existing cards within the card-sphere that are directed to an equivalent, or at least a similar subject, based on the card features provided by the user. As the user provides more card features, the suggested pre-existing cards become more filtered and directed to the subject that the user is generating a card for. In this way, the platform reduces the replication of multiple cards for a single or a group of similar subjects.

In at least one embodiment, the one or more pre-existing cards suggested to the user may be global cards that are included in various card networks, such as card network 400 of FIG. 4A, included in the platform. For instance, because the subject of global card 402 of card network 400 is Restaurant_A, when the user provides the name as Restaurant_A, global card 402 may be suggested to the user at block 604.

At decision block 606, it is determined whether the user has selected at least one of the pre-existing cards suggested at block 604. If the subjected of one of the suggested cards is equivalent to, or at least similar to the subject of the card that the user is generating, the user may select at least the suggested card that is directed to the equivalent or similar subject. Process 600 may flow to block 608. Otherwise, if the user does not select one of the suggested pre-existing cards, process 600 flows to block 610.

At block 608, a new user card is generated based on the selected card and/or the card features received at block 602. Furthermore, additional card features of the new user card may be inherited based on the pre-existing card selected at block 606. When the user selects the suggested global card 404 of card network 400 directed towards Restaurant_A, as discussed above, at least a portion the global card features 404 may be inherited. For instance, the address of Restaurant_A may already be included in global card features 404. As such, at least the address of Restaurant_A may be inherited at block 608 to populate the user card features of a new user card corresponding to Restaurant_A and being generated by user during process 600. Other features included in the selected card may be inherited to populate the card features of the user card at block 608. Inheriting card features at block 608 may include replicating at least a portion of the card features of the selected card in the newly generated user card. Process 600 may proceed to block 612.

At block 610, a new user card is generated based on the card features received at block 602. Furthermore, a new global card may be generated based on the card features received at block 602. Process 600 may proceed to block 612. At block 612, additional card features may be optionally received from the user. The user may provide additional card features via UI 490 of FIG. 4D. For instance, the user may provide multimedia content, tags, additional data fields, or the like to include in the card features at block 612.

At block 614, a global card may be optionally updated based on at least a portion of the card features received at least one of block 602 or block 612. The global card updated may be a pre-existing global card selected at block 606 or a new global card generated at block 610. In at least one embodiment, the global card may be updated based on a card network that includes the global card. For instance, the user may provide a website URL for the subject of the global card. The global card features may not yet include the website URL provided by the user. In such embodiments, the global card features may be updated to include the user provided website URL. For instance, the website URL may be replicated in the global card based on the card network. In at least one embodiment, updating the global card may be based on user permissions or user credentials of the user.

Figure 6B:
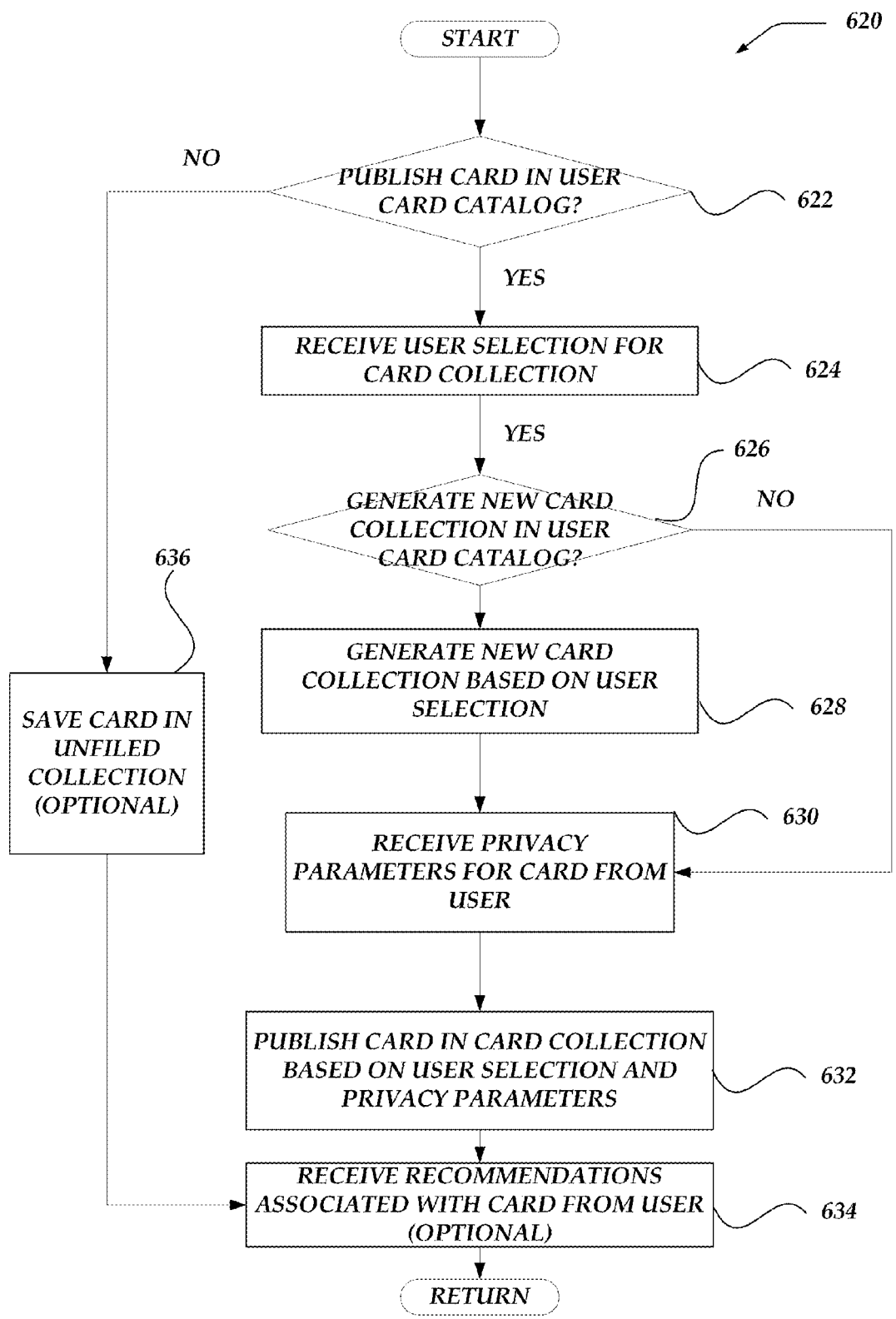
FIG. 6B shows an overview flowchart for a process to publish a card in a user card collection, in accordance with at least one of the various embodiments.

At block 616, the new user card may be optionally updated based on at least a portion of the card features received at least one of block 602 or block 612. In at least one embodiment, the user card may be updated based on at least a portion of the card features inherited at block 608. Various embodiments for updating the user card are discussed in at least the context of process 620 of FIG. 6B. Process 600 may terminate and/or returns to a calling process to perform other actions FIG. 6B shows an overview flowchart for a process to publish a card in a user card collection, in accordance with at least one of the various embodiments. Process 620 may begin, after a start block, at decision block 622 where it is determined whether the user will publish a card in the user's card catalog. For instance, a user may publish the card in the user's card catalog via button 488 of UI 480 of FIG. 4C, via publish button 495 of UI 490 of FIG. 4D, or some other UI provided to the user. If the user does not publish the card in the user card catalog process 620 flows to block 636, where the card may optionally be saved in the user's Unified collection. Otherwise, process 620 flows to block 624.

At block 624, a user section for a card collection is received. The user selection may indicate which card collection within the user's card catalog to publish the card in. For instance, the user may indicate that the card should be published in Restaurant card collection 466 of UI 460 of FIG. 4B. At decision block 626, it is determined whether to generate a new card collection in the user card catalog. For instance, if the user selects a card collection that is not currently in the user's card catalog, process 620 flows to block 628. Otherwise, process 620 flows to block 630.

At block 628, a new card collection is generated based on the user selection received at block 624. Accordingly, a user may be enabled to generate new card collections within the user's card catalog by providing a selection at block 626 that does not yet exist in the user's card catalog. Process 620 flows to block 620, where one or more privacy parameter for the card or the card collection is received from the user.

At block 632, the card may be published in card collection based on at least one of the user selection received at block 624 and the one or more privacy parameters received at block 630. At discussed herein, when the one or more privacy parameters indicate that at least one other user of the platform may be provided an indication that the card was published in one or more card collections of the user, the user has endorsed the card. In at least one embodiment, when a card is published in one or more card collections owned by the user, the card is associated with the user in one or more card networks.

Figure 7:
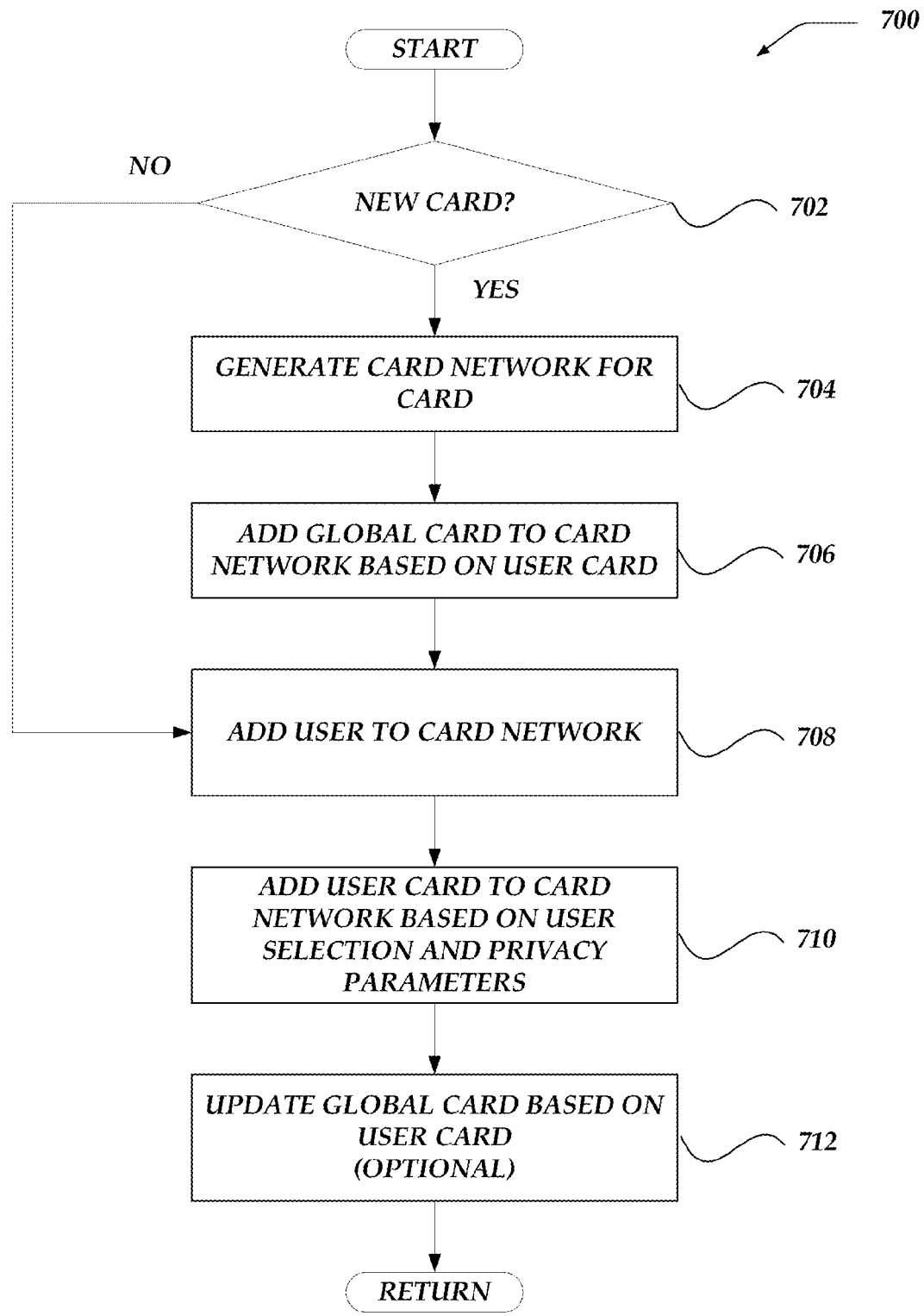
FIG. 7 shows an overview flowchart for a process to update a card network, in accordance with at least one of the various embodiments.

At block 634, one or more recommendations associated with the card may be optionally received from the user, or other users of the platform. Receiving recommendations associated with the card at block 634 may include receiving one or more recommendations, reviews, or comments regarding the card or the subject of the card. Recommendation window 487 of UI 480 of FIG. 4C shows a plurality of recommendations associated with a card for Restaurant_A. Process 620 may terminate and/or returns to a calling process to perform other actions FIG. 7 shows an overview flowchart for a process to update a card network, in accordance with at least one of the various embodiments. After a start block, process 700 begins at decision block 702 where it is determined whether the card is a new card. For instance, in process 600 of FIG. 6A, if the user selects a suggested card at decision block 606, the card is not a new card. Otherwise, if the user does not select a suggested card at decision block 606, or if s card is not suggested to the user at block 604, then the card is a new card. If the card is not a new card, process 700 flows to block 708. Otherwise, proves 700 flows to block 704.

At block 704, a new card network is generated for the card. The new card network may be associated with the subject of the card, or at least a similar subject to the subject of the card. At block 706, a global card is added to the card network. In at least one embodiment, the new global card generated at block 610 of process 600 is added to the card network. At block 708, the user is added to the card network. At block 710, the user card is added to the card network based on the user selections and privacy parameters. For instance, the new user card generated at block 608 or block 610 of process 600 may be added to the card network. The user selections may indicate which card collections the user cards are published in. Card network 400 of FIG. 4A includes a global card 402, a plurality of users cards that are associated with a plurality of users, and a plurality of user privacy parameters.

At block 712, the global card may be optionally updated based on the user card. For instance, at least because the global card is loosely coupled to the user card via the card network, at least a portion of the user card features of the user card may be replicated in the global card features of the global card. In at least another embodiment, the user card may be updated based on the global card. For instance, at least a portion of the global card features of the global card may be replicated in the user card features of the user card. Process 700 may terminate and/or returns to a calling process to perform other actions.

Figure 8:
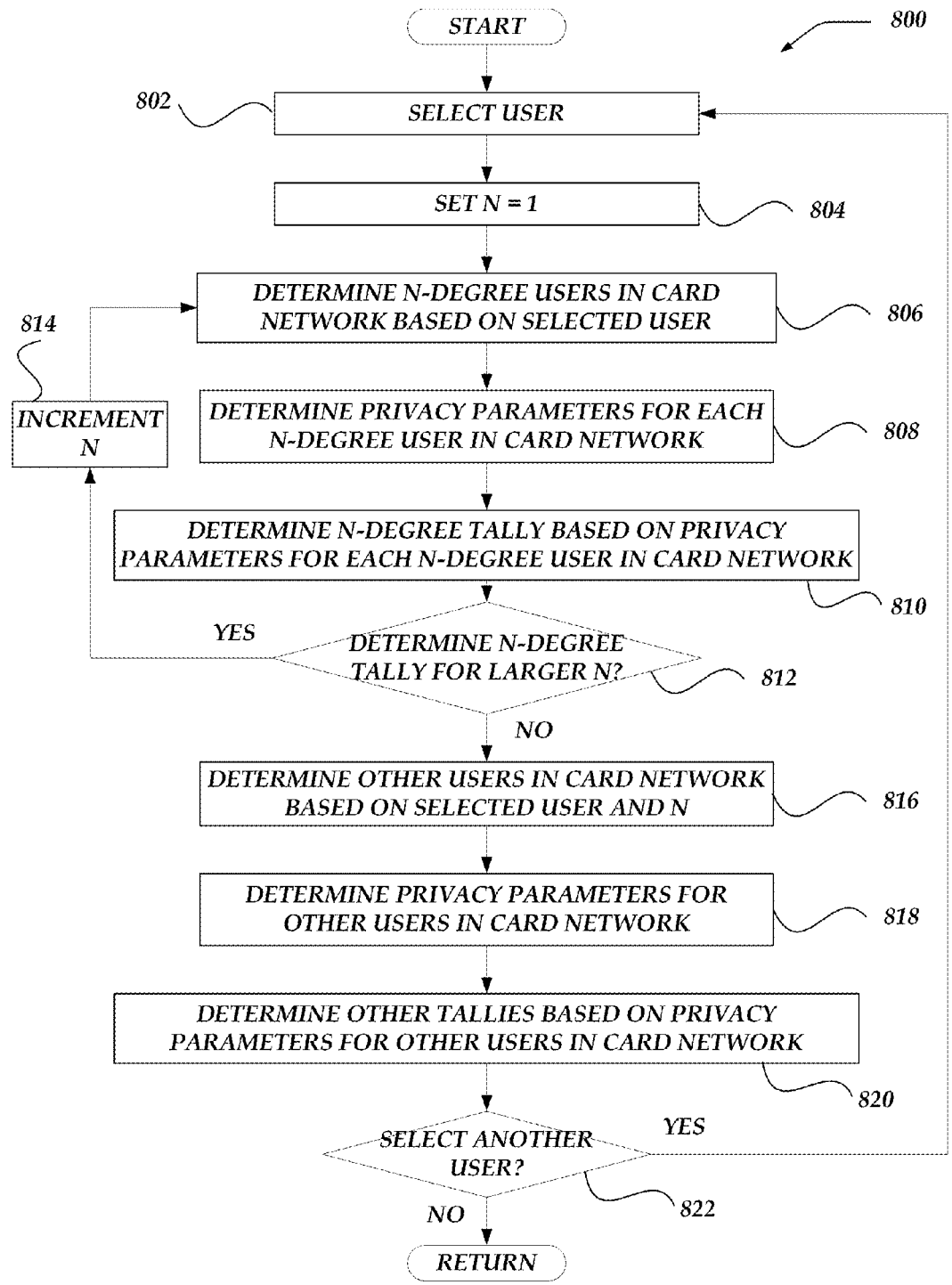
FIG. 8 shows an overview flowchart for a process to determine a plurality of card tallies for users, in accordance with at least one of the various embodiments.

FIG. 8 shows an overview flowchart for a process to determine a plurality of card tallies for users, in accordance with at least one of the various embodiments. Process 800 begins after a start block, at block 802, where a user of the platform is selected. Various card tallies that are specific to the selected user will be determined. At block 804, N is set to 1. At block 806, the N-degree users (with respect to the selected user) within a card network that includes the card are determined. Card network 400 of FIG. 4A is a non-limiting exemplary embodiment of a card network. When N=1, the friends of the selected user that are included in the card network are determined. When N=2, the friends of friends of the selected user that are included in the car network are determined. Such a determination may be generalized for larger values of N.

At block 808, one or more privacy parameters for each of the N-degree users (determined at block 806) are determined. For instance, card network 400 includes User_A privacy parameters 418 for User_A 410 that is associated with User_A card 412. At block 810, one or more N-degree tally scores are determined based on the privacy parameters for each N-degree user in the card network. For instance, when N=1, the number of the selected user's friends that have endorsed a card included in the card network may be determined. Accordingly, the 1-degree tally score may be equivalent to, or at least based on, the number of the selected user's friends that have endorsed the card. A user has endorsed a card when the user has generated an association with the card and at the privacy parameters associated with the card indicate that at least one other user of the platform may be provided an indication of the association between the card and the user.

When N=2, the number of the selected user's friends of friends that have endorsed a card included in the card network may be determined. Accordingly, the 2-degree tally score may be equivalent to, or at least based on, the number of the selected user's friends of friends that have endorsed the card.

At decision, block 812, it is determined whether one or more N-degree tally scores for a larger N-degree is to be determined. For instance, if N=1, and the tally score for friends of friends of the selected user are to be determined, process 800 flows to block 814. Otherwise, process 800 flows to block 816. At block 814, N may be incremented. For instance, if N=1, at block 814, N is incremented by 1 such that N=2. Process 800 returns to block 806 to determine the N-degree users (with respect to the selected user) for the incremented N.

At block 816, other uses in the card network that where not previously determined at block 806, are determined. At block 818, one or more privacy parameters for each of the other users (determined at block 816) are determined. At block 820, one or more tally scores for the other users are determined based on the privacy parameters for the other users in the card network. For instance, the number of other users that have endorsed the card may be determined at block 820.

At decision block 822, it is determined whether to select another user. If another user is to be selected, process 800 returns to block 802 to select another user. Otherwise, process 800 may terminate and/or returns to a calling process to perform other actions.

Figure 9A:
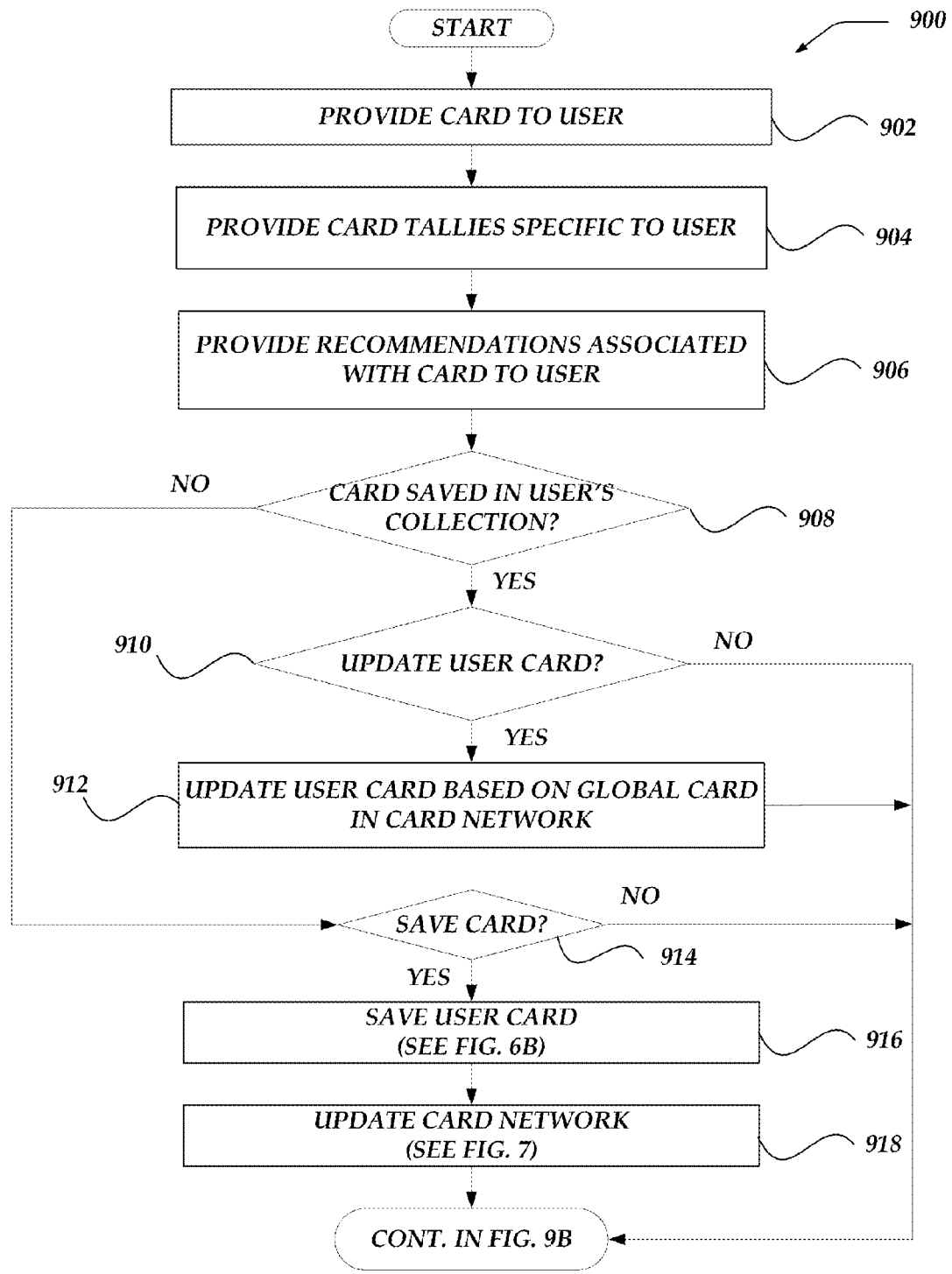
FIGS. 9A-9B shows an overview flowchart for a process to provide a card and a plurality of card tallies to users, in accordance with at least one of the various embodiments.
Figure 9B:
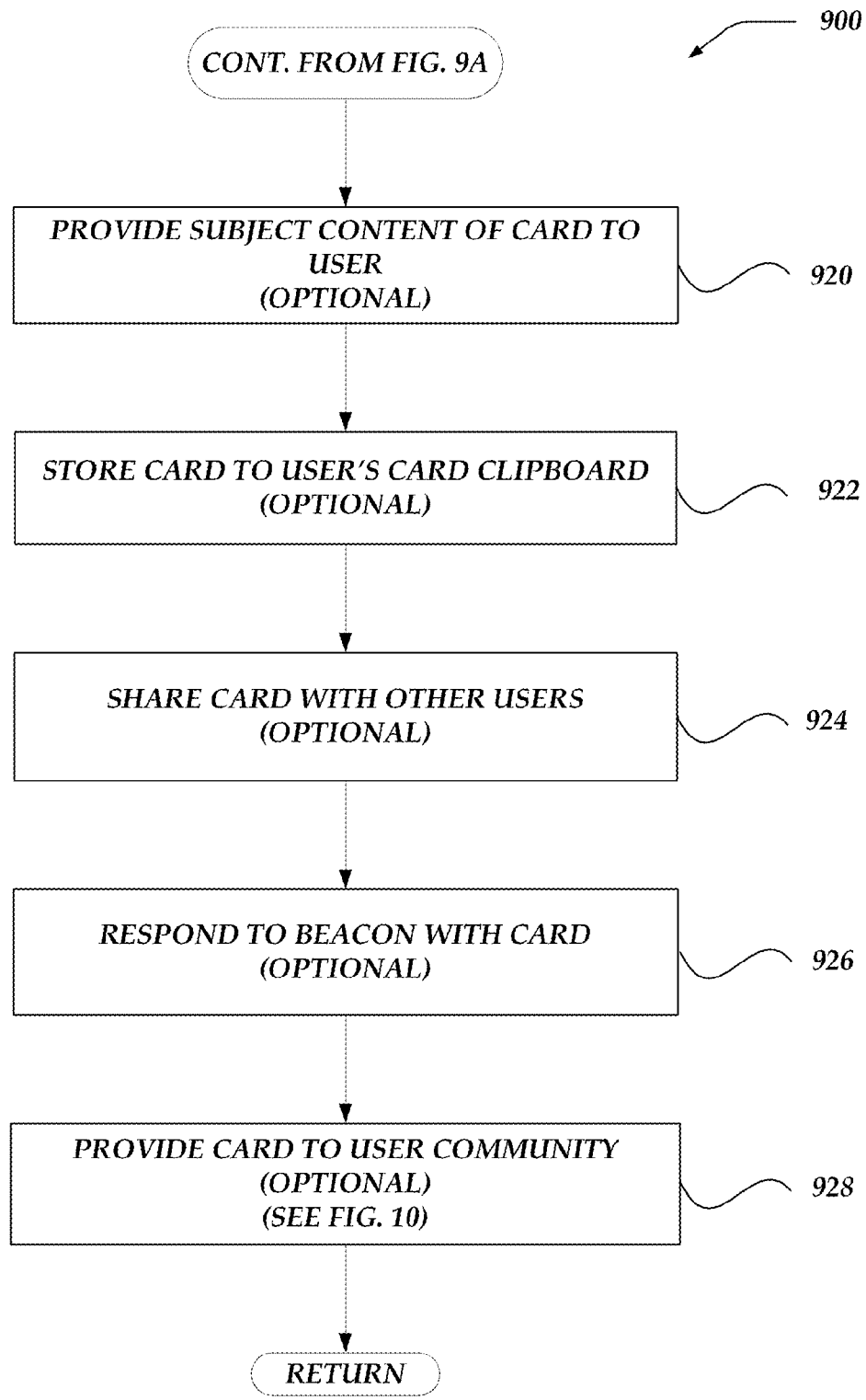

FIGS. 9A-9B shows an overview flowchart for a process to provide a card and a plurality of card tallies to users, in accordance with at least one of the various embodiments. After a start block, process 900 begins at block 902 of FIG. 9A. At block 902, at least a portion of a card is provided to user of the platform. In at least one embodiment, the card is provided to a separate, or other, user than the user who created the card. For instance, UI 480 of FIG. 4C provides Restaurant_A card 481 to User_Y. At block 904, one or more card tallies may be provided to the user. The card tallies may be specific to the user that was provided the card at block 902. The card tallies may be determined by process 800 of FIG. 8, or any other process discussed herein.

For instance, UI 480 of FIG. 4C is displaying (to User_Y) the card tallies 486 for Restaurant_A card 481 that are specific to User_Y. The card tallies 486 particular to User_Y are represented by a non-limiting 3-tuple (5, 18, 123). The 3-tuple indicates that 5 of User_Y's friends have endorsed Restaurant_A card 481, 18 friends of the User_Y's friends have endorsed Restaurant_A card, and 123 other users of the platform have endorsed Restaurant_A card 481. When another user views Restaurant_A card 481, via UI 480 or another UI, a separate N-tuple of scores representing the card tallies specific the other user may be presented to the other user.

At block 906, one or more recommendations associated with the card are provided to the user. By employing UI 480 of FIG. 4C, User_Y may view the recommendations associated with Restaurant_A card 481 via recommendation window 487. The recommendations may have been generated by other users. As discussed herein, users may be enabled to generate or otherwise provide recommendations, reviews, or comments regarding the card. For instance, a user may provide recommendations associated with a card at block 634 of process 620 of FIG. 6B, or in any other process discussed herein. The content provided in recommendation window 487 may be arranged such that User_Y can view the recommendations provided by User_Y's friends (such as User_A and User_B). User_Y may also review recommendations provided by the friends of User_Y's friends, such as User_E. In at least one embodiment, the recommendations provided by other users may be shown in recommendation window 487. A user may configure to what N-degree relationships to organize within recommendation window.

In decision block 908, it is determined whether the card is saved or published in the card collection of the user that was provided the card at block 902. In at least one embodiment, at decision block 908, it is determined whether a user card at least associated with or coupled to the card via a card network is saved in one or more card collections of the user. If the card is not saved in the card collection of the user, process 900 may flow to decision block 914. Otherwise, if at least a user card associated with or coupled to the card is saved or published in the card catalog of the user, process 900 may flow to decision block 910.

At decision block 910, it is determined whether to update the user card published or saved in the user's card catalog. For instance, if global card features of a global card in a card network that includes the user card have added, removed, updated, edited, or otherwise varied, at least a portion of the corresponding user card features included in the user cards may be selectively updated to reflect the varied global card features. Thus, if the global card features vary from the user card features, the user may be enabled to select whether to update the user card features. In at least one embodiment, the decision to update the user card features may be automatically performed based on a variance between the global card features and the user card features. In at least one embodiment, the decision to update the user card may be based on one or more user profile settings. If the user card is to be updated, process 900 flows to block 912. Otherwise, process 900 is continued at block 920 of FIG. 9B.

At block 912, the user card may be updated based on the global card in the card network. In at least one embodiment, at least a portion of the user card features of the user card may be updated based on the global card features of the user card. For instance, the global card features that are varied from the corresponding user card features may be replicated, such that the user card features are synchronized based on the varied global card features. From block 912, process 900 may flow to block 920 of FIG. 9B.

At decision block 916, it is determined whether to save or publish the card in the user's card catalog. For instance, a user may select to save or publish the card in one or more card collections via a UI, such as but not limited to UI 480 of FIG. 4C. If the user selects to save or publish the card, process 900 flows to block 916. Otherwise, process 900 may flow to block 920 of FIG. 9B.

At block 916, the card is saved or published in the user's card catalog. Various embodiments for saving or publishing a card are discussed in conjunction with process 920 of FIG. 9A. However, briefly, at block 916, at least a user card may be saved or published in one or more card collections of the user. At block 918, a card network that includes at least the user card or the global card may be updated. Various embodiments for updating a card network are discussed in conjunction with process 700 of FIG. 7. Process 900 may flow to block 920 of FIG. 9B.

At block 920 of FIG. 9B, subject content of the card may optionally be provided to the user. In at least one embodiment, a card, such as but not limited to Restaurant_A card 481 displayed in UI 480 of FIG. 4C may be arranged to visually simulate or resemble at least a portion of a physical business card. For instance, Restaurant_A card 481 may include a front side and a backside. The front side of Restaurant_A card 481 is shown in UI 480.

A user may be enabled to flip Restaurant_A card 481 to display the backside of the card by selection the "Click Here for Special Offer" button 485 embedded on the card. In various embodiments, the backside of the card may be protected, or otherwise reserved such that only the subject of the card may generate or otherwise provide content for the backside of the card. Accordingly, the card features or content that is included on the backside of the card may be subject content. For instance, Restaurant_A may provide a coupon or other offer to be displayed on the backside of Restaurant_A card 481. In such embodiments, the user must actively select to view the backside of a card to view and/or redeem the special offer. The platform may track the number of views of the backside of a card.

At block 922, the card may be optionally stored in one or more of the user's card clipboards. As discussed in conjunction with at least UI 1100 of FIG. 11, the platform may provide a user with one or more card clipboards 1130 accessible via UI 1100. A user may be enabled to add a card to a card clipboard 1130 by dragging and dropping a card into one or more of the clipboards 1130. At least one of the various UIs discussed herein may enable a user to add a card to one of the user's card clipboards via an add a card to a clipboard button. One or more cards may be stored in a card clipboard for later access. For instance, when viewing cards published by other users, a user may add a particular card to one of the user's card clipboards, including but not limited to Clipboard_A 1142 or Clipboard_B 1144. A user may later publish a card stored within one of their clipboards 1130, such as but not limited to Card_A 1134, Card_B 1136, or Card_C 1138, in the user's card catalog. A user may add another card to the user's card clipboards 1130, for later access, without publishing or endorsing the card. The user may be enabled to add, name, and/or rename a card clipboard via the add a clipboard button 1132.

At block 924, the card may optionally be shared. In at least one embodiment, the card may be shared with another user of the platform. In at least one embodiment, at least one of the UIs discussed herein, including but not limited to UI 460 of FIG. 4B, UI 480 of FIG. 4C, UI 490 of FIG. 4D, or UI 1100 of FIG. 11 may enable the sharing of a card with one or more users of the platform. A card may be shared with other users via a messages features of the platform. In at least one embodiment, the card may be shared with users of a separate or related platform that includes one or more social networks.

At block 926, the user may optionally respond to a beacon with the card. In at least some embodiments, the platform may enable users to generate beacons and respond to beacons generated by other users. In various embodiments, a beacon may include data, including but not limited to message data. In various embodiments, a beacon may include a request for information regarding one or more topics, a request for a referral or recommendation regarding one or more topics, a request for cards directed towards one or more topics, or any other such request. As such, a beacon may be provided to other users. In at least one embodiment, a beacon may be viewable to other users that view a user's homepage, such as by interacting with UI 1100. Beacons may be pushed out to other users, as a push request for information. Beacons may be published via a user's newsfeed, provided to other users via a platform message, or any other such mechanism.

As shown in UI 1100 of FIG. 11, users have responded to User_A's beacons. For instance, User_X has responded to User_A's first beacon 1122 by providing Card_F 1126, as well as corresponding message data. Similarly, User_F has responded to User_A's first beacon 1122 by providing Card_G 1128, as well as corresponding message data. User_H has responded to User_A's second beacon 1124 by providing Card_H 1129, as well as corresponding message data. In art least one embodiment, User_A may indicate which other users are enabled to view and/or respond to User_A's beacons by setting one or more privacy parameters.

At block 928, the card may optionally be provided to a user community of the platform. Various embodiments for providing a card to a user community are discussed in conjunction with at least process 1000 of FIG. 10. Process 900 may terminate and/or returns to a calling process to perform other actions.

Figure 10:
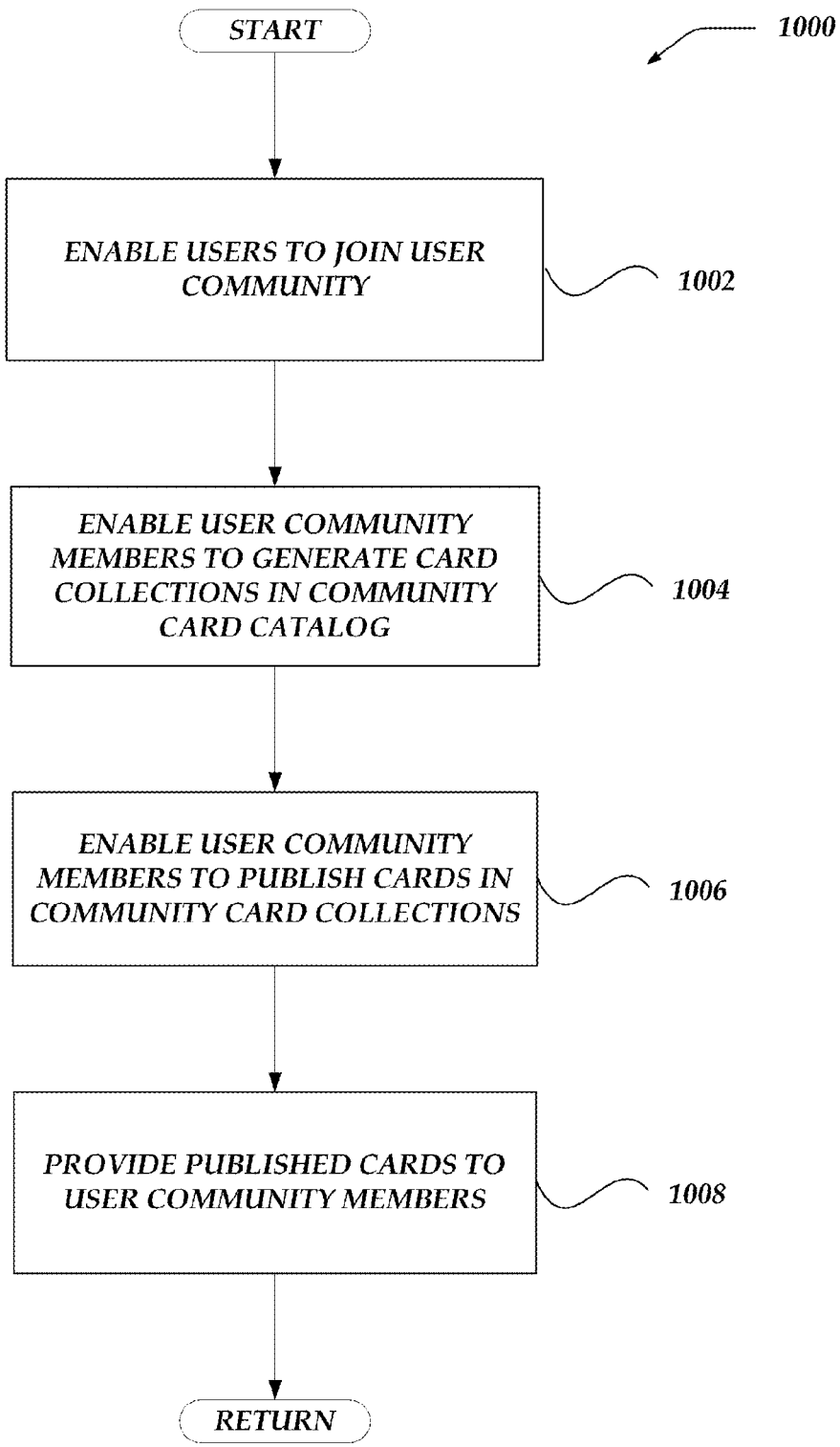
FIG. 10 shows an overview flowchart for a process to provide cards to a user community of a platform, in accordance with at least one of the various embodiments.

FIG. 10 shows an overview flowchart for a process to provide cards to a user community of a platform, in accordance with at least one of the various embodiments. After a start block, process 1000 may begin at block 1002, where at least a portion of the users of the platform are enabled to join a user community. In various embodiments, a user community may be a community of users or members that join the community to exchange information, content, cards, or the like, directed to a common topic, subject, organization, or the like. Members of a community may or may not be friends, or otherwise be connected via the social network of the platform. At block 1002, at least a portion of the users of the platform are enabled to join the user community. The portion of the users that are enabled to join the community may be based on one or more privacy parameters of the community. In at least one embodiment, when a user successfully joins a user community, the user is a community member.

At block 1004, at least a portion of the community members are enabled to generate card collections in a community card catalog. Similar to users, a user community may include a community card catalog. Similar to users generated card collection for their card catalogs, at least a portion of the community members may be enabled to generate card collections within the community card catalog.

At block 1006, at least a portion of the community members may be enabled to publish or save cards in community card catalog. Similar to users publishing cards in one or more of their card collections, at least a portion of the community members may publish cards in one or more community card collections included in the community card catalog. At block 1008, at least a portion of the card published in the community card catalog may be provided to at least a portion of the community members. Process 1000 may terminate and/or returns to a calling process to perform other actions.

Illustrative Use Cases

FIG. 11 shows one exemplary embodiment of a user interface that enables a user to interact with a platform that is in accordance with at least a portion of the various embodiments. UI 1100 may provide a homepage associated with a user, such as User_A. A user may own the user's associated homepage. In at least one embodiment, the user's homepage is a portal to provide the user various functionality of the platform. For instance, a home page may enable the associated user to manage the user's account, communicate with other users of the platform, engage in communities within the platform, generate and manage cards, card catalogs, and card collections, as well as various other features.

In some embodiments, the owner of the homepage may be enabled to edit various information provided via UI 1100, while other users may be enabled to only view information provided by UI 110. The user may provide or not-provide other users access to various features of the platform enabled by UI 1100. The user may control the providing and not-providing by setting one or more privacy parameters. For instance, User_A may enable friends of User_A to view information about User_A via About User_A portion 1112, while prohibiting other users that are not friends from viewing such information. Similarly, User_A may enable friends, as well as friends of friends to view User_A's card catalog and card collection by selecting card catalog button 1110, while prohibiting more distant users from viewing User_A's card, based on one or more privacy parameters. For instance, User_Y may be enabled to view User_A's card catalog by selecting card catalog button 1110. Upon selection by User_Y, the platform may provide User_Y with UI 460 of FIG. 4B, which enables User_Y to view User_A card catalog 462.

In various embodiments, a user may be provided a news feed generated by other users of the platform. Following button 1102 may enable User_A to manage User_A's newsfeed as well as indicate which other users are enabled to provide content to the User_A's newsfeed. Messages button 1106 may enable User_A to send and receive message data to other users, including but not limited to the user's friends and other N-degree users. Friends button 1108 may enable User_A to generate an association with other users by sending and responding to friend requests over the platform.

UI 1100 may include a search function 1114 that enables User_A, as well as other users to search the platform for other users, communities, cards, beacons, and the like. The user associated with the homepage may be enabled to generate a card via add a card button 1116. By selecting the add a card button 1116 of UI 1100, User_A may be provided a user interface that is at least similar to UI 490 of FIG. 4D.

The platform may provide a user with one or more card clipboards 1130 accessible via UI 1100. User_A may be enabled to add a card to a card clipboard 1130 by dragging and dropping a card into one or more of the clipboards 1130. At least one of the various UIs discussed herein may enable a user to add a card to one of the user's card clipboards via an add a card to a clipboard button. One or more cards may be stored in a card clipboard for later access. For instance, when viewing cards published by other users, User_A may add a particular card to one User_A's card clipboards, including but not limited to Clipboard_A 1142 or Clipboard_B 1144. User_A may later publish a card stored within one of their clipboards 1130, such as but not limited to Card_A 1134, Card_B 1136, or Card_C 1138, in User_A's card catalog. User_A may add another card to User_A's card clipboards 1130, for later access, without publishing or endorsing the card. User_A may be enabled add, name, and/or rename a card clipboard via the add a clipboard button 1132.

In at least some embodiments, the platform may enable users to generate beacons, view beacons generated by other users, and respond to the beacons generated by other users by providing cards to the user that generated the beacon. In various embodiments, a beacon may include data, including but not limited to message data. In various embodiments, a beacon may include a request for information regarding one or more topics, a request for a referral or recommendation regarding one or more topics, a request for cards directed towards one or more topics, or any other such request. As such, a beacon may be provided to other users. In at least one embodiment, a beacon may be viewable to other users that view a user's homepage, such as by interacting with UI 1100. Beacons may be pushed out to other users, as a push request for information. Beacons may be published via a user's newsfeed, provided to other users via a platform message, or any other such mechanism.

Beacon portion 1120 of UI 1100 displays various beacons for User_A. As shown in FIG. 11, User_A has generated a first beacon 1122 and a second beacon 1124, requesting information about different topics. User_A may have generated at least one of the beacons via the Add a beacon button 1123. Other users may respond to User_A's beacons by sharing or providing relevant cards, messages, information, and the like. Other users may respond to one or more of User_A's beacons by dragging and dropping a card, or other data including but not limited to multimedia and/or message data, into the beacon portion 1120 of User_A's homepage. Alternatively, a user may employ the respond to a beacon button 1124 on User_A's homepage. User_A may respond to another user's beacons by also employing the respond to a beacon button 1124.

As shown in FIG. 11, other users have responded to User_A's beacons. For instance, User_X has responded to User_A's first beacon 1122 by providing Card_F 1126, as well as corresponding message data. Similarly, User_F has responded to User_A's first beacon 1122 by providing Card_G 1128, as well as corresponding message data. User_H has responded to User_A's second beacon 1124 by providing Card_H 1129, as well as corresponding message data. In art least one embodiment, User_A may indicate which other users are enabled to view and/or respond to User_A's beacons by setting one or more privacy parameters.

As discussed herein, platform may enable users to join and participate in communities. For instance, process 1000 of FIG. 10 discusses various embodiments of providing a community with a plurality of cards. User_A may join and participate in various communities by at least selecting Communities button 1104.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for providing referrals of cards to users with a network computer that performs actions, comprising:
   generating an association between the card and a first user based on a first user selection of the card and one or more privacy parameters that are provided by the first user and associated with the card; and
   employing the association between the card and the first user and the one or more privacy parameters to update a card network to include the card and the first user;
   employing connections in one or more social networks between the first user and a second user to provide a degree of connectivity between the second user and the first user;
   determining a first card tally of the one or more card tallies based on a number of users that are included in the card network and have a 1-degree connectivity with the second user in the social network;
   determining a second card tally of the one or more card tallies based on a number of users that are included in the card network and have a 2-degree connectivity with the second user in the social network; and
   determining a third card tally of the one or more card tallies based on a number of users that are included in the card network and have a degree connectivity with the second user that is greater than a 2-degree connectivity;
   employing the updated card network, the degree of connectivity between the second user and the first user, and one or more of the second user's privacy parameters to provide one or more card tallies that are specific to the second user;
   configuring a non-transitory storage memory to store a plurality of N-tuple of scores that are based on a metric for other users that have endorsed the card, wherein each card tally includes an N-tuple that lists both an N number of other users that are friends of the first user and have endorsed the card; and
   providing the card with the one or more card tallies to the second user, wherein each card tally is retrieved from the non-transitory storage memory to evaluate the card.

2. The method of claim 1, further comprising:
   receiving two or more card features from the first user;
   providing one or more suggested cards to the first user based on the one or more card features; and
   providing additional card features to the first user based on a selection by the first user of one or more of the suggested cards.

3. The method of claim 1, further comprising:
   receiving one or more card features from the first user;
   updating one or more global card features included in a global card that is included in the card network based on the received card features; and
   updating one or more user card features included in a user card that is included in the card network and associated with the second user based on the updated global features.

4. The method of claim 1, further comprising:
   receiving a beacon from a third user; and
   receiving a response to the beacon from the second user, wherein the response includes the card; and
   providing the response to the beacon to the third user.

5. The method of claim 1, further comprising:
   receiving a request from the second user to join a user community; and
   providing the card to the user community based on a selection received from the second user.

6. The method of claim 1, further comprising:
   receiving subject content from a subject of the card;
   updating a first portion of one or more card features to include the subject content;
   providing a front side of a visual representation of the card to the second user, wherein the front side of the card includes a second portion of the one or more card features;
   receiving a user selection from the second user; and
   providing a backside of a visual representation of the card to the second user based on the second user selection, wherein the backside of the card includes the first portion of the card features.

7. The method of claim 1, the method further comprising employing a geolocation signal from a hardware device to localize a display to one or more users, wherein the localized display includes one or more cards, card networks, or social networks.

8. A system providing referrals of cards to users over a network, comprising:
   a transceiver that communicates over the network;
   a memory that stores at least instructions; and
   a processor device that executes instructions that perform actions, comprising:
      generating an association between the card and a first user based on a first user selection of the card and one or more privacy parameters that are provided by the first user and associated with the card; and
      employing the association between the card and the first user and the one or more privacy parameters to update a card network to include the card and the first user;
      employing connections in one or more social networks between the first user and a second user to provide a degree of connectivity between the second user and the first user;
      determining a first card tally of the one or more card tallies based on a number of users that are included in the card network and have a 1-degree connectivity with the second user in the social network;
      determining a second card tally of the one or more card tallies based on a number of users that are included in the card network and have a 2-degree connectivity with the second user in the social network; and
      determining a third card tally of the one or more card tallies based on a number of users that are included in the card network and have a degree connectivity with the second user that is greater than a 2-degree connectivity;
      employing the updated card network, the degree of connectivity between the second user and the first user, and one or more of the second user's privacy parameters to provide one or more card tallies that are specific to the second user;
      configuring a non-transitory storage memory to store a plurality of N-tuple of scores that are based on a metric for other users that have endorsed the card, wherein each card tally includes an N-tuple that lists both an N number of other users that are friends of the first user and have endorsed the card; and
      providing the card with the one or more card tallies to the second user, wherein each card tally is retrieved from the non-transitory storage memory to evaluate the card.

9. The system of claim 8, the actions further comprising;
receiving two or more card features from the first user;
providing one or more suggested cards to the first user based on the one or more card features; and
providing additional card features to the first user based on a selection by the first user of one or more of the suggested cards.

10. The system of claim 8, the actions further comprising:
receiving one or more card features from the first user;
updating one or more global card features included in a global card that is included in the card network based on the received card features; and
updating one or more user card features included in a user card that is included in the card network and associated with the second user based on the updated global features.

11. The system of claim 8, the actions further comprising:
receiving a beacon from a third user; and
receiving a response to the beacon from the second user, wherein the response includes the card; and
providing the response to the beacon to the third user.

12. The system of claim 8, the actions further comprising:
receiving a request from the second user to join a user community; and
providing the card to the user community based on a selection received from the second user.

13. The system of claim 8, the actions further comprising:
receiving subject content from a subject of the card;
updating a first portion of one or more card features to include the subject content;
providing a front side of a visual representation of the card to the second user, wherein the front side of the card includes a second portion of the one or more card features;
receiving a user selection from the second user; and
providing a backside of a visual representation of the card to the second user based on the second user selection, wherein the backside of the card includes the first portion of the card features.

14. The system of claim 8, the actions further comprising employing a geolocation signal from a hardware device to localize a display to one or more users, wherein the localized display includes one or more cards, card networks, or social networks.

15. A processor readable non-transitory storage media that includes instructions for providing referrals of cards to users, wherein execution of the instructions by a processor device performs actions, comprising:
generating an association between the card and a first user based on a first user selection of the card and one or more privacy parameters that are provided by the first user and associated with the card; and
employing the association between the card and the first user and the one or more privacy parameters to update a card network to include the card and the first user;
employing connections in one or more social networks between the first user and a second user to provide a degree of connectivity between the second user and the first user;
determining a first card tally of the one or more card tallies based on a number of users that are included in the card network and have a 1-degree connectivity with the second user in the social network;
determining a second card tally of the one or more card tallies based on a number of users that are included in the card network and have a 2-degree connectivity with the second user in the social network; and
determining a third card tally of the one or more card tallies based on a number of users that are included in the card network and have a degree connectivity with the second user that is greater than a 2-degree connectivity;
employing the updated card network, the degree of connectivity between the second user and the first user, and one or more of the second user's privacy parameters to provide one or more card tallies that are specific to the second user;
configuring a non-transitory storage memory to store a plurality of N-tuple of scores that are based on a metric for other users that have endorsed the card, wherein each card tally includes an N-tuple that lists both an N number of other users that are friends of the first user and have endorsed the card; and
providing the card with the one or more card tallies to the second user, wherein each card tally is retrieved from the non-transitory storage memory to evaluate the card.

16. The processor readable non-transitory storage media of claim 15, the actions further comprising;
receiving two or more card features from the first user;
providing one or more suggested cards to the first user based on the one or more card features; and
providing additional card features to the first user based on a selection by the first user of one or more of the suggested cards.

17. The processor readable non-transitory storage of claim 15, the actions further comprising:
receiving one or more card features from the first user;
updating one or more global card features included in a global card that is included in the card network based on the received card features; and
updating one or more user card features included in a user card that is included in the card network and associated with the second user based on the updated global features.

18. The processor readable non-transitory storage of claim 15, the actions further comprising:
receiving a beacon from a third user; and
receiving a response to the beacon from the second user, wherein the response includes the card; and
providing the response to the beacon to the third user.

19. The processor readable non-transitory storage of claim 15, the actions further comprising:
receiving a request from the second user to join a user community; and
providing the card to the user community based on a selection received from the second user.

20. The processor readable non-transitory storage of claim 15, the actions further comprising:
receiving subject content from a subject of the card;
updating a first portion of one or more card features to include the subject content;
providing a front side of a visual representation of the card to the second user, wherein the front side of the card includes a second portion of the one or more card features;
receiving a user selection from the second user; and
providing a backside of a visual representation of the card to the second user based on the second user selection, wherein the backside of the card includes the first portion of the card features.

21. The processor readable non-transitory storage of claim 15, the actions further comprising employing a geolocation signal from a hardware device to localize a display to one or more users, wherein the localized display includes one or more cards, card networks, or social networks.

* * * * *

UNITED STATES PATENT AND TRADEMARK OFFICE
CERTIFICATE OF CORRECTION

| | | |
|---|---|---|
| PATENT NO. | : 9,438,691 B1 | Page 1 of 2 |
| APPLICATION NO. | : 14/923250 | |
| DATED | : September 6, 2016 | |
| INVENTOR(S) | : Andrews et al. | |

It is certified that error appears in the above-identified patent and that said Letters Patent is hereby corrected as shown below:

In Fig. 2, Sheet 2 of 16, for Tag "200", in Line 2, delete "COMPTER" and insert -- COMPUTER --, therefor.

In Fig. 6A, Sheet 9 of 16, in Block "608", in Line 3, delete "BASED" and insert -- BASED ON --, therefor.

In Column 1, Line 62, delete "FIGS. 9A-9B shows" and insert -- FIGS. 9A-9B show --, therefor.

In Column 3, Line 27, delete "card" and insert -- card. --, therefor.

In Column 14, Line 25, delete "system" and insert -- system. --, therefor.

In Column 15, Lines 60-61, delete "embodiments;" and insert -- embodiments. --, therefor.

In Column 18, Line 56, delete "viewing" and insert -- viewing. --, therefor.

In Columns 18 & 19, Lines 61-67 & 1-2, delete "User_A has................for N." and insert the same at Line 60, after "cards", as a continuation Paragraph.

In Column 22, Line 28, delete "included in in" and insert -- included in --, therefor.

In Column 25, Lines 23-30, delete "FIG. 4B,............................User_A." and insert the same at Line 22, after "420 of", as a continuation Paragraph.

In Column 26, Line 43, delete "configures" and insert -- configure --, therefor.

In Column 28, Line 57, delete "actions" and insert -- actions. --, therefor.

In Column 29, Line 40, delete "actions" and insert -- actions. --, therefor.

Signed and Sealed this
Sixth Day of March, 2018

Andrei Iancu
*Director of the United States Patent and Trademark Office*

CERTIFICATE OF CORRECTION (continued)
U.S. Pat. No. 9,438,691 B1

In Column 30, Line 62, delete "that where" and insert -- that were --, therefor.

In Column 31, Line 9, delete "FIGS. 9A-9B shows" and insert -- FIGS. 9A-9B show --, therefor.

In Column 39, Line 1, in Claim 9, delete "comprising;" and insert -- comprising: --, therefor.

In Column 40, Line 19, in Claim 16, delete "comprising;" and insert -- comprising: --, therefor.

In Column 40, Line 26, in Claim 17, delete "storage" and insert -- storage media --, therefor In Column 40, Line 36, in Claim 18, delete "storage" and insert -- storage media --, therefor.

In Column 40, Line 41, in Claim 19, delete "storage" and insert -- storage media --, therefor.

In Column 40, Line 47, in Claim 20, delete "storage" and insert -- storage media --, therefor.

In Column 40, Line 60, in Claim 21, delete "storage" and insert -- storage media --, therefor.